US010305565B2

(12) United States Patent
Hammarwall et al.

(10) Patent No.: US 10,305,565 B2
(45) Date of Patent: *May 28, 2019

(54) METHODS AND ARRANGEMENTS FOR CSI REPORTING

(71) Applicant: TELEFONAKTIEBOLAGET LM ERICSSON (PUBL), Stockholm (SE)

(72) Inventors: David Hammarwall, Vallentuna (SE); Svante Bergman, Hägersten (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 37 days.

This patent is subject to a terminal disclaimer.

(21) Appl. No.: 15/486,716

(22) Filed: Apr. 13, 2017

(65) Prior Publication Data

US 2017/0244461 A1 Aug. 24, 2017

Related U.S. Application Data

(63) Continuation of application No. 14/923,496, filed on Oct. 27, 2015, now Pat. No. 9,641,236, which is a
(Continued)

(51) Int. Cl.
*H04L 12/26* (2006.01)
*H04B 7/06* (2006.01)
(Continued)

(52) U.S. Cl.
CPC .......... *H04B 7/0626* (2013.01); *H04B 7/0456* (2013.01); *H04B 7/063* (2013.01);
(Continued)

(58) Field of Classification Search
CPC ... H04W 76/02; H04W 76/025; H04W 52/16; H04W 52/325
(Continued)

(56) References Cited

U.S. PATENT DOCUMENTS 7,961,774 B2 6/2011 Onggosanusi et al.
8,135,349 B2 3/2012 Hwang et al.
(Continued)

FOREIGN PATENT DOCUMENTS

CN 102149130 A 8/2011
CN 102291212 A 12/2011
(Continued)

OTHER PUBLICATIONS

Extended European Search Report dated Apr. 12, 2017 in related EP Application No. 16205352.4 (references cited in search report were previously cited in IDS filed on Apr. 13, 2017).
(Continued)

*Primary Examiner* — Dmitry Levitan
(74) *Attorney, Agent, or Firm* — Patent Portfolio Builders PLLC

(57) ABSTRACT

Some embodiments provide a method in a wireless device for reporting channel state information, CSI, for a CSI process. The CSI process corresponds to a reference signal resource and an interference measurement resource. According to the method, the wireless device obtains an adjustment value associated with the CSI process. The wireless device estimates an effective channel based on one or more reference signals received in the reference signal resource, and applies the adjustment value to the estimated effective channel, thereby obtaining an adjusted effective channel. Furthermore, the wireless device determines channel state information based on the adjusted effective channel, and on interference estimated based on the interference measurement resource. Finally, the channel state information is transmitted to a network node.

40 Claims, 14 Drawing Sheets

Related U.S. Application Data continuation of application No. 13/469,843, filed on May 11, 2012, now Pat. No. 9,204,317.

(51) Int. Cl.

| | | |
|---|---|---|
| *H04W 24/02* | (2009.01) | |
| *H04L 5/00* | (2006.01) | |
| *H04B 7/0456* | (2017.01) | |
| *H04L 1/00* | (2006.01) | |
| *H04L 25/02* | (2006.01) | |
| *H04L 25/03* | (2006.01) | |
| *H04W 24/10* | (2009.01) | |
| *H04W 52/16* | (2009.01) | |
| *H04W 52/32* | (2009.01) | |

(52) U.S. Cl.
CPC ......... *H04B 7/0617* (2013.01); *H04B 7/0619* (2013.01); *H04B 7/0639* (2013.01); *H04L 1/0026* (2013.01); *H04L 5/005* (2013.01); *H04L 5/0035* (2013.01); *H04L 5/0057* (2013.01); *H04L 25/0224* (2013.01); *H04L 25/03949* (2013.01); *H04W 24/02* (2013.01); *H04W 24/10* (2013.01); *H04L 5/0026* (2013.01); *H04W 52/16* (2013.01); *H04W 52/325* (2013.01)

(58) Field of Classification Search
USPC ............... 370/241, 252, 270, 310, 328, 329; 455/403, 422, 423, 500; 709/249
See application file for complete search history.

(56) References Cited

U.S. PATENT DOCUMENTS

| | | |
|---|---|---|
| 8,798,550 B2 | 8/2014 | Hammarwall et al. |
| 9,252,932 B2 | 2/2016 | Gao et al. |
| 9,264,915 B2 | 2/2016 | Seo et al. |
| 9,332,528 B2 | 5/2016 | Kim et al. |
| 9,408,085 B2 | 8/2016 | Abe et al. |
| 2011/0149765 A1 | 6/2011 | Gorokhov et al. |
| 2013/0102304 A1 | 4/2013 | Lee et al. |
| 2013/0114430 A1 | 5/2013 | Kovisto et al. |
| 2013/0242769 A1 | 9/2013 | Hammarwall et al. |
| 2014/0018118 A1 | 1/2014 | Hammarwall |
| 2015/0373732 A1 | 12/2015 | Davydov et al. |

FOREIGN PATENT DOCUMENTS

| | | |
|---|---|---|
| WO | 2011115421 A2 | 9/2011 |
| WO | 2011126025 A1 | 10/2011 |

OTHER PUBLICATIONS

3GPP; Overview of 3GPP Release 8 V0.3.3 (Sep. 2014); Sep. 2014; pp. 1-244. [downloaded on Oct. 9, 2014 from the internet at http://www.3gpp.org/ftp/Information/WORK_PLAN/Description_Releases/].

3rd Generation Partnership Project (3GPP); Overview of 3GPP Release 10 V0.1.10 (Sep. 2013); pp. 1-144.

3rd Generation Partnership Project (3GPP); Overview of 3GPP Release 11 V0.1.6 (Sep. 2013); pp. 1-184.

Alcatel-Lucent, Alcatel-Lucent Shanghai Bell; "Remaining Issues for Downlink reference signals for CoMP"; GPP TSG-RAN WG1 Meeting #68bis; R1-121243; 3rd Generation Partnership Project (3GPP) XP050599535; Mar. 26-30, 2012; pp. 1-3; Jeju, Korea.

Ericsson, ST-Ericsson; "CQI Definition of UE Emulated Intra CoMP Cluster Interference"; 3GPP TSG-RAN WG1 Meeting #68bis; R1-121740; 3rd Generation Partnership Project (3GPP) XP05099994; Mar. 30, 2012; pp. 1-3; Jeju, Korea.

Ericsson, ST-Ericsson; "Interference Measurement Offset"; 3GPP TSG-RAN WG1 Meeting #70; R1-123829; 3rd Generation Partnership Project (3GPP) XP050661682; Aug. 13-17, 2012; pp. 1-3; Qingdao, China.

Etsi, "Overview of 3GPP Release 10 V0.1.10 (Sep. 2013)," ETSI MCC Department, 650 Route des Lucioles—Sophia Antipolis, Valbonne, France, Sep. 2013.

Etsi, "Overview of 3GPP Release 11 V0.1.6 (Sep. 2013)," ETSI MCC Department, 650 Route des Lucioles—Sophia Antipolis, Valbonne, France, Sep. 2013.

HiSilicon Huawei; "Configuration of CSI-RS"; 3GPP TSG-RAN WG1 Meeting #68; R1-120036; 3rd Generation Partnership Project (3GPP) XP050562623; Feb. 6-10, 2012; pp. 1-3; Dresden, Germany.

International Preliminary Report on Patentability in corresponding International Application No. PCT/SE2013/050514 dated Aug. 11, 2014.

International Search Report in corresponding International Application No. PCT/SE2013/050514 dated Sep. 16, 2013.

Jeanette Wannstrom for 3GPP; "LTE-Advanced"; May 2012; pp. 1-4.

Panasonic; "Signalling Support for CRS Interference Handling in Low Power ABS"; 3GPP TSG-RAN WG1 Meeting #68; R1-120222; 3rd Generation Partnership Project (3GPP) XP050562779; Feb. 6-10, 2012; pp. 1-4; Dresden, Germany.

Renesas Mobile Europe Ltd.; "Feedback operation for coordinated multi-point operation"; 3GPP TSG-RAN WG1 Meeting #67; R1-113892; 3rd Generation Partnership Project (3GPP) XP050561972; Nov. 14-18, 2011; pp. 1-4; San Francisco, CA, USA.

Renesas Mobile Europe Ltd.; Downlink control signaling for CoMP; 3GPP TSG-RAN WG1 Meeting #68bis; R1-121395; 3rd Generation Partnership Project (3GPP) XP050599682; Mar. 26-30, 2012; pp. 1-4; Jeju, Korea.

Written Opinion in corresponding International Application No. PCT/SE2013/050514 dated Sep. 16, 2013.

Office Action in corresponding Chilean Application No. 3068-14 dated Jul. 26, 2016.

Office Action dated Mar. 2, 2017 in related CN Application No. 20130024579.9.

Notice of Rejection in corresponding Japanese Application No. 2015-511416 dated Mar. 17, 2017.

Huawei, HiSilicon; "Resources for Interference Measurements"; R1-120983; 3GPP TSG RAG WG1 meeting #68bis; Mar. 26-30, 2012; pp. 1-9; Jeju, Korea.

LTE/3GPP; "3GPP TS 36.213 V10.5.0 (Mar. 2012) Technical Specification, 3rd Generation Partnership Project; Technical Specification Group Radio Access Network; Evolved Universal Terrestrial Radio Access (E-UTRA); Physical layer procedures (Release 10)"; Mar. 2012; 124 pages.

PRIOR ART

PRIOR ART

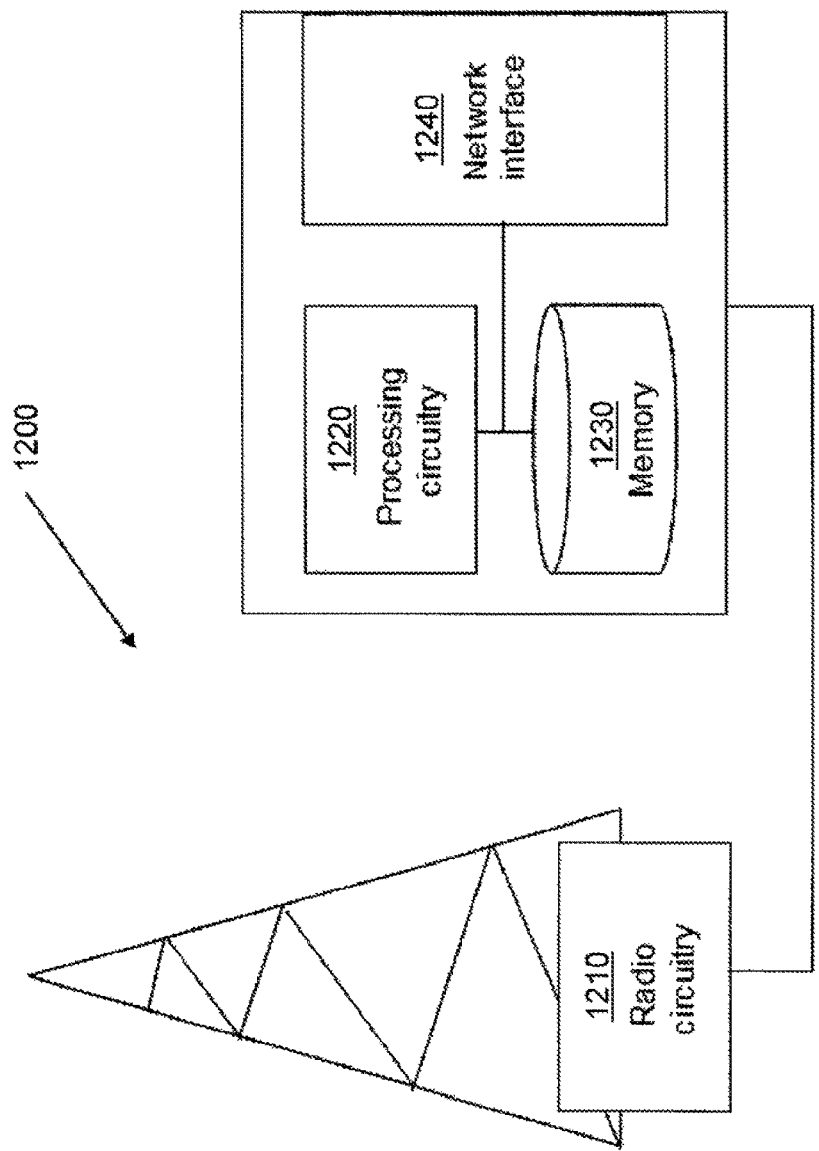

METHODS AND ARRANGEMENTS FOR CSI REPORTING

TECHNICAL FIELD

This invention relates to methods and arrangements for reporting channel state information.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

LTE uses orthogonal frequency-division multiplexing (OFDM) in the downlink and discrete-Fourier-transform-spread (DFT-spread) OFDM in the uplink. The basic LTE physical resource can be seen as a time-frequency grid, as illustrated in FIG. 1, where each time-frequency resource element (TFRE) corresponds to one subcarrier during one OFDM symbol interval, on a particular antenna port. There is one resource grid per antenna port. The resource allocation in LTE is described in terms of resource blocks, where a resource block corresponds to one slot in the time domain and 12 contiguous 15 kHz subcarriers in the frequency domain. Two time-consecutive resource blocks represent a resource block pair, which corresponds to the time interval upon which scheduling operates.

An antenna port is a "virtual" antenna, which is defined by an antenna port-specific reference signal (RS). An antenna port is defined such that the channel over which a symbol on the antenna port is conveyed can be inferred from the channel over which another symbol on the same antenna port is conveyed. The signal corresponding to an antenna port may possibly be transmitted by several physical antennas, which may also be geographically distributed. In other words, an antenna port may be transmitted from one or several transmission points. Conversely, one transmission point may transmit one or several antenna ports. Antenna ports may interchangeably be referred to as "RS ports".

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. LTE Release 10 and above (also referred to as LTE-Advanced) enables support of eight-layer spatial multiplexing with possibly channel dependent precoding. Such spatial multiplexing is aimed for high data rates in favorable channel conditions. An illustration of precoded spatial multiplexing is provided in FIG. 2.

As seen, the information carrying symbol vector s is multiplied by an $N_T \times r$ precoder matrix $W_{N_T \times r}$, which serves to distribute the transmit energy in a subspace of the $N_T$ dimensional vector space, where $N_T$ corresponds to the number of antenna ports. The r symbols in s each are part of a symbol stream, a so-called layer, and r is referred to as the transmission rank. In this way, spatial multiplexing is achieved since multiple symbols can be transmitted simultaneously over the same TFRE. The number of layers, r, is typically adapted to suit the current channel properties.

Furthermore, the precoder matrix is often selected from a codebook of possible precoder matrices, and typically indicated by means of a precoder matrix indicator (PMI), which for a given rank specifies a unique precoder matrix in the codebook. If the precoder matrix is confined to have orthonormal columns, then the design of the codebook of precoder matrices corresponds to a Grassmannian subspace packing problem.

The received $N_R \times 1$ vector $y_n$ on the data TFRE indexed n is modeled by $$y_n = H_n W_{N_T \times r} s_n + e_n \qquad (1)$$

where $e_n$ is a noise plus interference vector modeled as realizations of a random process. The precoder for rank r, $W_{N_T \times r}$, can be a wideband precoder, which is either constant over frequency, or frequency selective.

The precoder matrix is often chosen to match the characteristics of the $N_R \times N_T$ MIMO channel H, resulting in so-called channel dependent precoding. When based on UE feedback, this is commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

In closed-loop precoding, the UE transmits, based on channel measurements in the forward link, or downlink, recommendations to the base station, which in LTE is called the evolved NodeB (eNodeB) of a suitable precoder to use. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other entities than precoders to assist the eNodeB in subsequent transmissions to the UE. Thus, channel state information may include one or more of PMI, channel quality indicators (CQIs) or rank indicator (RI).

Signal and channel quality estimation is a fundamental part of a modern wireless system. Noise and interference estimates are used not only in the demodulator, but are also important quantities when estimating, for example, the channel quality indicator (COI), which is typically used for link adaptation and scheduling decisions on the eNodeB side.

The term $e_n$ in (1) represents noise and interference in a TFRE and is typically characterized in terms of second order statistics such as variance and correlation. The interference can be estimated in several ways including from the cell-specific reference symbols (RS) that are present in the time-frequency grid of LTE. Such RS may correspond to the Rel-8 cell-specific RS, CRS (antenna ports 0-3), which are illustrated in FIG. 3, as well as the new CSI RS available in Rel-10, which will be described in more detail below. CRS are sometimes also referred to as common reference signals.

Estimates of interference and noise can be formed in various ways. Estimates can easily be formed based on TFREs containing cell specific RS since $s_n$ and $W_{N_T \times r}$ are then known and $H_n$ is given by the channel estimator. It is further noted that the interference on TFREs with data that is scheduled for the UE in question can also be estimated as soon as the data symbols, $s_n$ are detected, since at that moment they can be regarded as known symbols. The latter interference can alternatively also be estimated based on second order statistics of the received signal and the signal intended for the UE of interest, thus possibly avoiding needing to decode the transmission before estimating the interference term. Alternatively the interference can be measured on TFREs where the desired signal is muted, so the received signal corresponds to interference only. This has the advantage that the interference measurement may be more accurate and the UE processing becomes trivial because no decoding or desired signal subtraction need to be performed.

Channel State Information Reference Signal (CSI-RS)

In LTE Release-10, a new reference symbol sequence, the CSI-RS, was introduced for the purpose of estimating channel state information. The CSI-RS provides several advantages over basing the CSI feedback on the cell-specific reference symbols (CRS) which were used for that purpose in previous releases. Firstly, the CSI-RS is not used for demodulation of the data signal, and thus does not require the same density. In other words, the overhead of the CSI-RS is substantially less. Secondly, CSI-RS provides a much more flexible means to configure CSI feedback measurements. For example, which CSI-RS resource to measure on can be configured in a UE specific manner. Moreover, the support of antenna configurations larger than 4 antennas must resort to CSI-RS, since the CRS is only defined for at most 4 antennas.

By measuring on a CSI-RS a UE can estimate the effective channel the CSI-RS is traversing including the radio propagation channel, antenna gains, and any possible antenna virtualizations. A CSI-RS port may be precoded so that it is virtualized over multiple physical antenna ports; that is, the CSI-RS port can be transmitted on multiple physical antenna ports, possibly with different gains and phases. In more mathematical rigor this implies that if a known CSI-RS signal $x_n$ is transmitted, a UE can estimate the coupling between the transmitted signal and the received signal, i.e. the effective channel. Hence if no virtualization is performed in the transmission:

$$y_n = H_n x_n + e_n$$

the UE can measure the effective channel $H_{eff} = H_n$. Similarly, if the CSI-RS is virtualized using a precoder $W_{N_T \times r}$ as $$y_n = H_n W_{N_T \times r} x_n + e_n$$

the UE can estimate the effective channel $H_{eff} = H_n W_{N_T \times r}$.

Related to CSI-RS is the concept of zero-power CSI-RS resources (also known as a muted CSI-RS) that are configured just as regular CSI-RS resources, so that a UE knows that the data transmission is mapped around those resources. The intent of the zero-power CSI-RS resources is to enable the network to mute the transmission on the corresponding resources as to boost the SINR of a corresponding non-zero power CSI-RS, possibly transmitted in a neighbor cell/transmission point. For Rel-11 of LTE, a special zero-power CSI-RS that a UE is mandated to use for measuring interference plus noise is under discussion. As the name indicates, a UE can assume that the TPs of interest are not transmitting on the muted CSI-RS resource and the received power can therefore be used as a measure of the interference plus noise level.

Based on a specified CSI-RS resource and an interference measurement configuration, e.g. a muted CSI-RS resource, the UE can estimate the effective channel and noise plus interference, and consequently also determine which rank, precoder and transport format to recommend that best match the particular channel.

Power Measurement Offset

As mentioned above, in LTE a terminal provides the network with channels state information, by means of recommending a particular transmission for a measured effective channel, for example a combination of PMI, RI, and a CQI. To enable this recommendation the UE needs to know the relative power offset between the reference signals (that are used for measuring the effective channel), and a hypothesized upcoming data transmission. In the following we refer to such a power offset as a power measurement offset (PMO). This power offset is tied to a specific reference signal, for example, it relates to the parameter Pc which is part of the configuration message for setting up a measurement on a CSI-RS, or to the parameter nomPDSCH-RS-EPRE-Offset for CRS.

In practice, CQIs are rarely perfect and substantial errors might be present which means that the estimated channel quality does not correspond to the actual channel quality seen for the link over which the transmission takes place. The eNodeB can to some extent reduce the detrimental effects of erroneous CQI reporting by means of outer-loop adjustment of the CQI values. By monitoring the ACK/NACK signaling of the hybrid ARQ, the eNodeB can detect if the block error rate (BLER), or a related measure, is below or above the target value. Using this information, the eNodeB can decide to use more offensive (or defensive) MCS than recommended by the UE. However, outer loop control is a crude tool for improving link adaptation and the convergence of the loops can be slow.

Also, it is more difficult for the eNodeB to deviate from recommended rank, because the CQI reports relates directly to the rank. A change in rank therefore renders the information provided by the CQI reports difficult or impossible to utilize—that is, the eNodeB would have severe difficulties knowing which MCS to use on the different data streams if the eNodeB would override the rank recommended by the UE.

The network can improve the rank reporting by adjusting a PMO in the UE. For example, if the power measurement offset is decreased (causing the terminal to assume a lower power for the transmitted data channel), the terminal will tend to recommend a lower rank since the "optimal" rank is increasing with SINR.

Coordinated Multipoint Transmission (CoMP)

CoMP transmission and reception refers to a system where the transmission and/or reception at multiple, geographically separated antenna sites is coordinated in order to improve system performance. More specifically, CoMP refers to coordination of antenna arrays that have different geographical coverage areas. In the subsequent discussion we refer to a set of antennas covering essentially the same geographical area in the same manner as a point, or more specifically as a Transmission Point (TP). Thus, a point might correspond to one of the sectors at a site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Although the present disclosure focuses mainly on downlink CoMP transmission, it should be appreciated that in general, a transmission point may also function as a reception point. The coordination between points can either be distributed, by means of direct communication between the different sites, or by means of a central coordinating node. A further coordination possibility is a "floating cluster" where each transmission point is connected to, and coordinates, a certain set of neighbors (e.g. two neighbors). A set of points that perform coordinated transmission and/or transmission is referred to as a CoMP coordination cluster, a coordination cluster, or simply as a cluster in the following.

FIG. 5 shows an example wireless network with a CoMP coordination cluster comprising three transmission points, denoted TP1, TP2 and TP3.

CoMP is a tool introduced in LTE to improve the coverage of high data rates, the cell-edge throughput and/or to increase system throughput. In particular, the goal is to distribute the user perceived performance more evenly in the network by taking control of the interference in the system, either by reducing the interference and/or by better prediction of the interference.

CoMP operation targets many different deployments, including coordination between sites and sectors in cellular macro deployments, as well as different configurations of Heterogeneous deployments, where for instance a macro node coordinates the transmission with pico nodes within the macro coverage area.

There are many different CoMP transmission schemes that are considered; for example, Dynamic Point Blanking where multiple transmission points coordinates the transmission so that neighboring transmission points may mute the transmissions on the time-frequency resources (TFREs) that are allocated to UEs that experience significant interference.

Coordinated Beamforming where the TPs coordinate the transmissions in the spatial domain by beamforming the transmission power in such a way that the interference to UEs served by neighboring TPs are suppressed.

Dynamic Point Selection where the data transmission to a UE may switch dynamically (in time and frequency) between different transmission points, so that the transmission points are fully utilized.

Joint Transmission where the signal to a UE is simultaneously transmitted from multiple TPs on the same time/frequency resource. The aim of joint transmission is to increase the received signal power and/or reduce the received interference, if the cooperating TPs otherwise would serve some other UEs without taking our JT UE into consideration.

CoMP Feedback

A common denominator for the CoMP transmission schemes is that the network needs CSI information not only for the serving TP, but also for the channels linking the neighboring TPs to a terminal. By, for example, configuring a unique CSI-RS resource per TP, a UE can resolve the effective channels for each TP by measurements on the corresponding CSI-RS. Note that the UE is likely unaware of the physical presence of a particular TP, it is only configured to measure on a particular CSI-RS resource, without knowing of any association between the CSI-RS resource and a TP.

A detailed example showing which resource elements within a resource block pair may potentially be occupied by UE-specific RS and CSI-RS is provided in FIG. 4. In this example, the CSI-RS utilizes an orthogonal cover code of length two to overlay two antenna ports on two consecutive REs. As seen, many different CSI-RS patterns are available. For the case of 2 CSI-RS antenna ports, for example, there are 20 different patterns within a subframe. The corresponding number of patterns is 10 and 5 for 4 and 8 CSI-RS antenna ports, respectively.

A CSI-RS resource may be described as the pattern of resource elements on which a particular CSI-RS configuration is transmitted. One way of determining a CSI-RS resource is by a combination of the parameters "resourceConfig", "subframeConfig", and "antennaPortsCount", which may be configured by RRC signaling.

Several different types of CoMP feedback are possible. Most alternatives are based on per CSI-RS resource feedback, possibly with CQI aggregation of multiple CSI-RS resources, and also possibly with some sort of co-phasing information between CSI-RS resources. The following is a non-exhaustive list of relevant alternatives (note that a combination of any of these alternatives is also possible):

Per CSI-RS resource feedback corresponds to separate reporting of channel state information (CSI) for each of a set of CSI-RS resources. Such a CSI report may, for example, comprise one or more of a Precoder Matrix Indicator (PMI), Rank Indicator (RI), and/or Channel Quality Indicator (CQI), which represent a recommended configuration for a hypothetical downlink transmission over the same antennas used for the associated CSI-RS, or the RS used for the channel measurement. More generally, the recommended transmission should be mapped to physical antennas in the same way as the reference symbols used for the CSI channel measurement.

Typically there is a one-to-one mapping between a CSI-RS and a TP, in which case per CSI-RS resource feedback corresponds to per-TP feedback; that is, a separate PMI/RI/CQI is reported for each TP. Note that there could be interdependencies between the CSI reports; for example, they could be constrained to have the same RI. Interdependencies between CSI reports have many advantages, such as; reduced search space when the UE computes feedback, reduced feedback overhead, and in the case of reuse of RI there is a reduced need to perform rank override at the eNodeB.

The considered CSI-RS resources are configured by the eNodeB as the CoMP Measurement Set. In the example shown in FIG. 5, different measurement sets may be configured for wireless devices 540 and 550. For example, the measurement set for wireless device 540 may consist of CSI-RS resources transmitted by TP1 and TP2, since these points may be suitable for transmission to device 540. The measurement set for wireless device 550 may instead be configured to consist of CSI-RS resources transmitted by TP2 and TP3. The wireless devices will report CSI information for the transmission points corresponding to their respective measurement sets, thereby enabling the network to e.g. select the most appropriate transmission point for each device.

Aggregate feedback corresponds to a CSI report for a channel that corresponds to an aggregation of multiple CSI-RS. For example, a joint PMI/RI/CQI can be recommended for a joint transmission over all antennas associated with the multiple CSI-RS.

A joint search may however be too computationally demanding for the UE, and a simplified form of aggregation is to evaluate an aggregate CQI which are combined with per CSI-RS resource PMIs, which should typically all be of the same rank corresponding to the aggregated CQI or CQIs. Such a scheme also has the advantage that the aggregated feedback may share much information with a per CSI-RS resource feedback. This is beneficial, because many CoMP transmission schemes require per CSI-RS resource feedback, and to enable eNodeB flexibility in dynamically selecting CoMP scheme, aggregated feedback would typically be transmitted in parallel with per CSI-RS resource feedback. To support coherent joint transmission, such per CSI-RS resource PMIs can be augmented with co-phasing information enabling the eNodeB to rotate the per CSI-RS resource PMIs so that the signals coherently combine at the receiver.

Interference Measurements for CoMP

For efficient CoMP operation it is equally important to capture appropriate interference assumptions when determining the CSI as it is to capture the appropriate received desired signal.

For the purpose of this disclosure, a CSI process is defined as the reporting process of CSI (e.g., CQI and potentially associated PMI/RI) for a particular effective channel, and an interference measurement resource. Optionally, a CSI process may also be associated with one or more interference emulation configurations, as will be explained below. The effective channel is defined by a reference signal resource comprising one or multiple associated reference sequences. The interference measurement resource is a set of resource elements in which one or more signals that are assumed to be interfering with the desired signal are received. The IMR may correspond to a particular CQI reference resource, e.g. a CRS resource. Alternatively, the IMR may be a resource configured specifically for measuring interference.

In uncoordinated systems the UE can effectively measure the interference observed from all other TPs (or all other cells), which will be the relevant interference level in an upcoming data transmission. Such interference measurements are typically performed by analyzing the residual interference on CRS resources, after the UE subtracts the impact of the CRS signal. In coordinated systems performing CoMP such interference measurements becomes increasingly irrelevant. Most notably, within a coordination cluster an eNodeB can to a large extent control which TPs that interfere a UE in any particular TFRE. Hence, there will be multiple interference hypotheses depending on which TPs are transmitting data to other terminals.

For the purpose of improved interference measurements new functionality is introduced in LTE Release 11, where the agreement is that the network will be able to configure which particular TFREs that is to be used for interference measurements for a particular UE; this is defined as an interference measurement resource (IMR). The network can thus control the interference seen on a IMR, by for example muting all TPs within a coordination cluster on the associated TFREs, in which case the terminal will effectively measure the inter CoMP cluster interference. In the example shown in FIG. 5, this would correspond to muting TP1, TP2 and TP3 in the TFREs associated with the IMR.

Consider for example a dynamic point blanking scheme, where there are at least two relevant interference hypotheses for a particular UE: in one interference hypothesis the UE sees no interference from the coordinated transmission point; and in the other hypothesis the UE sees interference from the neighboring point. To enable the network to effectively determine whether or not a TP should be muted, the network may configure the UE to report two, or generally multiple CSIs corresponding to different interference hypotheses—that is, there can be two CSI processes corresponding to different interference situations. Continuing the example of FIG. 5, assume that the wireless device 550 is configured to measure CSI from TP3. However, TP2 may potentially interfere with a transmission from TP2, depending on how the network schedules the transmission. Thus, the network may configure the device 550 with two CSI processes for TP3 (or, more specifically, for measuring the CSI-RS transmitted by TP3). One CSI process is associated with the interference hypothesis that TP2 is silent, and the other CSI process corresponds to the hypothesis that TP3 is transmitting an interfering signal.

To facilitate such a scheme it has been proposed to configure multiple IMRs, wherein the network is responsible for realizing each relevant interference hypothesis in the corresponding IMR. Hence, by associating a particular IMR with a particular CSI process, relevant CSI information, e.g. CQI, can be made available to the network for effective scheduling. In the example of FIG. 5, the network may, for example, configure one IMR in which only TP2 is transmitting, and another IMR in which TP2 and TP3 are both silent. Each CSI process may then be associated with a different IMR.

Although the possibility of associating a CSI process with one or more IMRs enables the network to obtain a better basis for making link adaptation and scheduling decisions, there is still room for further improvement when determining channel state information. In particular, there is a need for improved mechanisms of estimating interference for a particular CSI process.

SUMMARY

An object of some embodiments is to provide an improved mechanism for CSI reporting. Another object of some embodiments is to enable improved link adaptation.

A further object of some embodiments is to improve the estimation of interference for a CSI process, especially in CoMP scenarios.

Some embodiments provide a method in a wireless device for reporting channel state information, CSI, for a CSI process. The CSI process corresponds to a reference signal resource and an interference measurement resource. The wireless device obtains an adjustment value associated with the CSI process. The wireless device then estimates an effective channel based on one or more reference signals received in the reference signal resource, and applies the adjustment value to the estimated effective channel, obtaining an adjusted effective channel. Then, the wireless device determines channel state information based on the adjusted effective channel, and on interference estimated based on the interference measurement resource. Finally, the wireless device transmits the channel state information to a network node.

Some embodiments provide a method in a network node for receiving channel state information, CSI, for a CSI process from a wireless device. The network node is associated with a cluster for coordinated multipoint transmission. The network node transmits to the wireless device an indication of an adjustment value associated with the CSI process. The wireless device then receives channel state information related to the CSI process from the wireless device.

Some embodiments provide a wireless device for reporting channel state information, CSI, for a CSI process. The wireless device comprises processing circuitry and radio circuitry. The processing circuitry is configured to obtain an adjustment value associated with the CSI process, to estimate an effective channel based on one or more reference signals received, via the radio circuitry, in the reference signal resource, to apply the adjustment value to the estimated effective channel, obtaining an adjusted effective channel, to determine channel state information based on the adjusted effective channel, and on interference estimated based on the interference hypothesis; and to transmit, via the radio circuitry, the channel state information to a network node.

Some embodiments provide a network node for receiving, from a wireless device, channel state information, CSI, for a CSI process. The network node comprises processing circuitry and is connectable to radio circuitry. The processing circuitry is configured to transmit, via the radio circuitry, an indication of an adjustment value associated with the CSI process to the wireless device. The processing circuitry is further configured to receive, via the radio circuitry, channel state information related to the CSI process from the wireless device.

Some embodiments provide an improved power measurement offset configuration, resulting in improved link adaptation. This in turn translates to increased performance in terms of increased spectral efficiency and reduced retransmissions in the hybrid ARQ.

BRIEF DESCRIPTION OF THE DRAWINGS

FIG. 12a is a block diagram illustrating a network node according to some embodiments.

DETAILED DESCRIPTION

A particular problem affecting interference measurements for CoMP is that, even within a single CoMP coordination cluster, different UEs will be configured for CoMP measurements on different TPs within the cluster; that is, each UE may be configured with a separate CoMP Measurement Set not spanning all nodes in the coordination cluster. Hence, each such UE will see a different set of TPs as residual, or uncoordinated, interference.

In particular for larger CoMP clusters it may become prohibitive to configure a distinct IMR for each such residual interference combination. Hence, for some configurations of the CoMP Measurement Set the UE will measure a residual interference lacking the contribution from one or more interfering TPs, and/or wherein one or more TPs that should not interfere are actually included.

This mismatch between the interference measured for the CSI reporting, and the actual interference seen in a downlink transmission, will deteriorate the link adaptation of the network and degrade the overall performance and spectral efficiency of the network. A particularly challenging problem is when incorrectly measured interference levels causes the UE to report mismatched transmission ranks, which is difficult for the eNodeB to override because of the tight coupling to the CQI(s) and the PMI.

Moreover, the interference level experienced for different CSI reports may be substantially different, which may make it challenging to make a power measurement offset have the desired effect for all different operating points.

Some embodiments address these problems by providing a CSI-process-specific adjustment value, which may be a power measurement offset or a scaling factor, and which the wireless device applies to the effective channel as estimated based on the reference signal configuration of the CSI process. The channel state information is then determined based on the adjusted effective channel. The adjustment value is determined such that it fully or partially compensates for an incorrectly measured or estimated interference level. Particular embodiments enable a different power measurement offset behavior for different CSI reports. Hence, a power measurement offset should have a component that is specific for each CSI process, in contrast with the prior art, where a power measurement offset is always tied to a specific reference signal.

By separately configuring power measurement offsets for the different CSI processes the impact of incorrect interference measurements, which typically impact different CSI processes differently, can be compensated for already in a UE and thereby improve recommended transmission ranks and corresponding CQIs. Moreover, the different operating points, caused by different interference levels, for the power measurement can be accommodated getting the desired behavior on, for example, rank reporting for each of the CSI processes.

Figure 1:
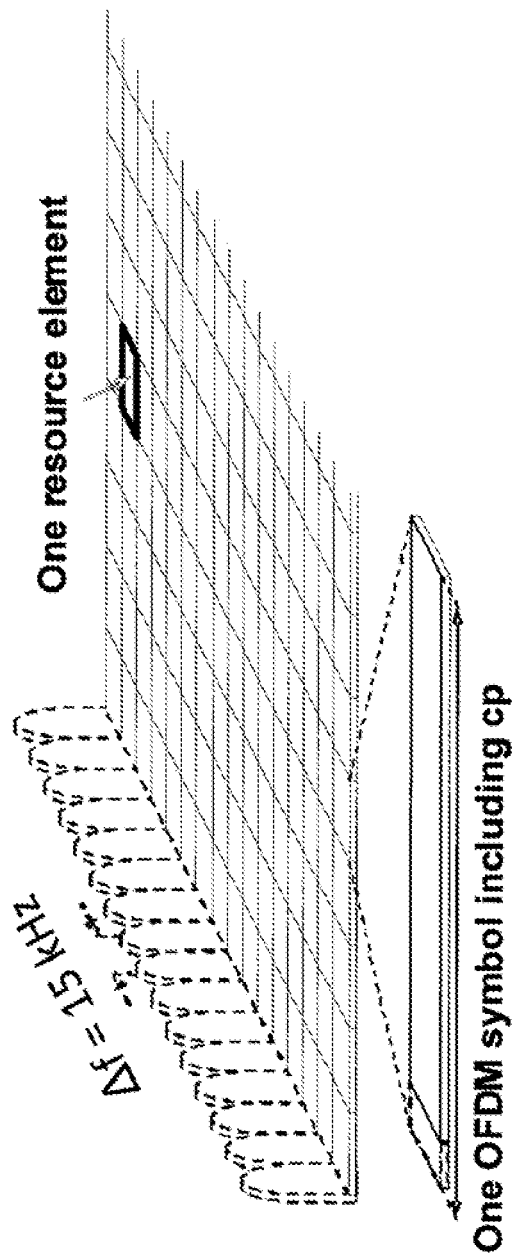
FIG. 1 is a schematic diagram illustrating the LTE time-frequency resource grid.
Figure 2:
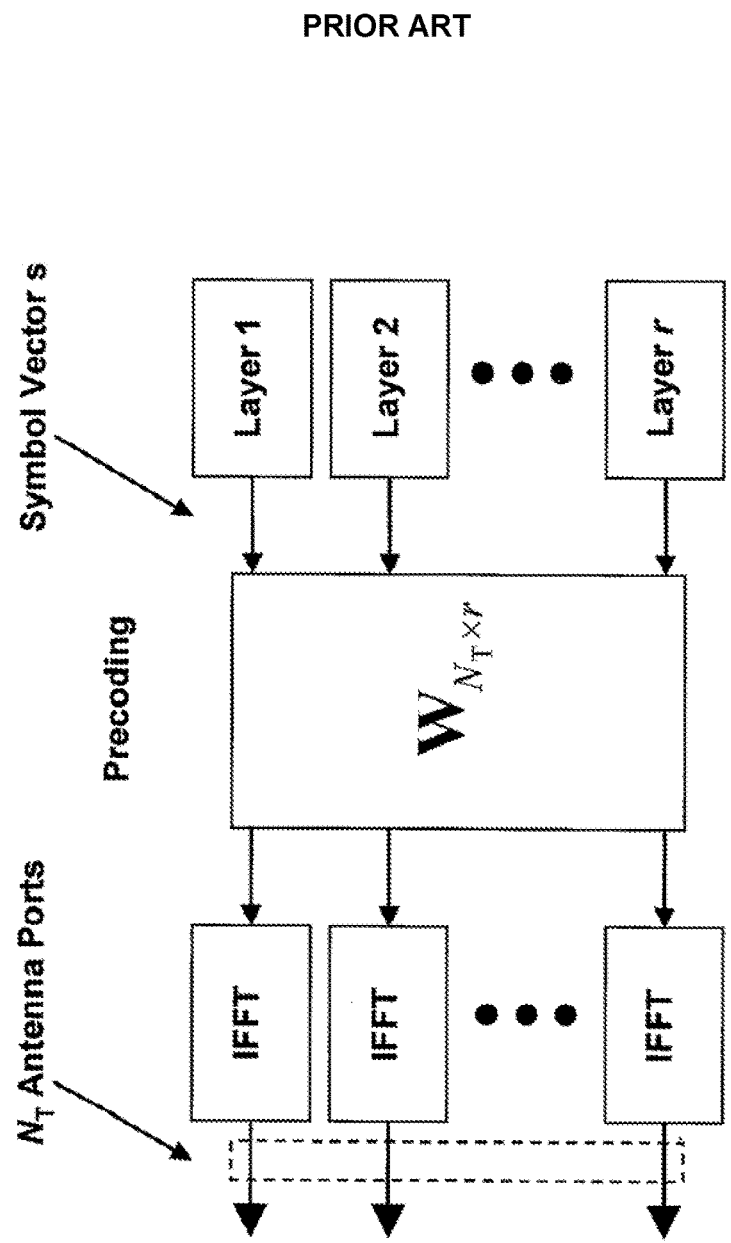
FIG. 2 is a schematic block diagram illustrating the transmission structure of the precoded spatial multiplexing mode in LTE.
Figure 3:
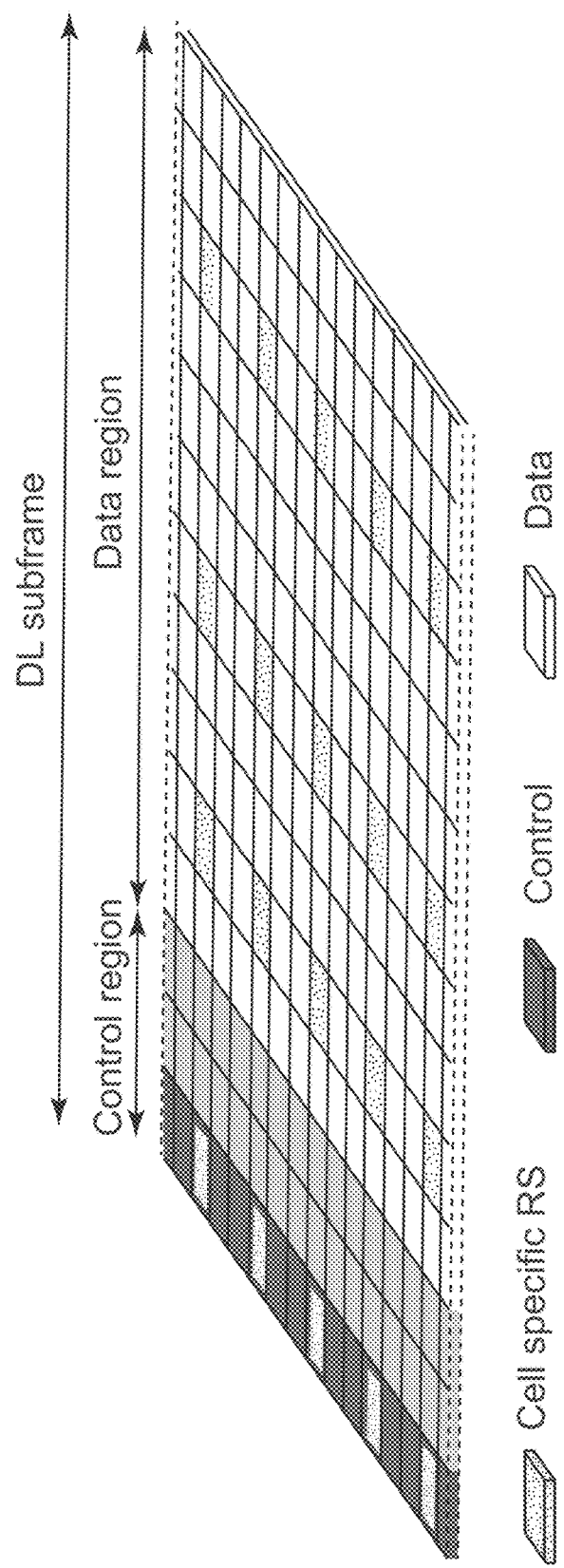
FIG. 3 is a schematic diagram illustrating cell-specific reference signals.
Figure 4:
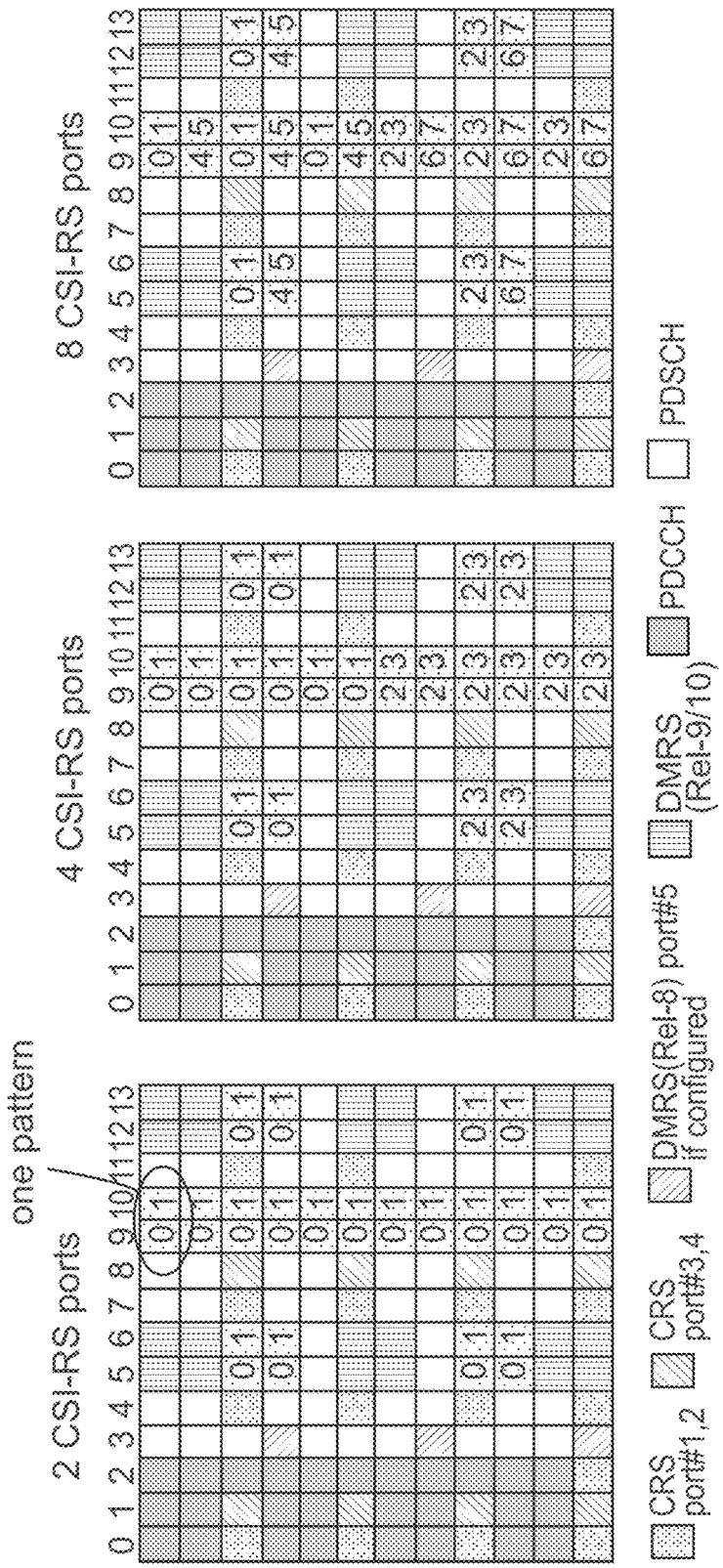
FIG. 4 is a schematic diagram showing example layouts of reference signals.
Figure 5:
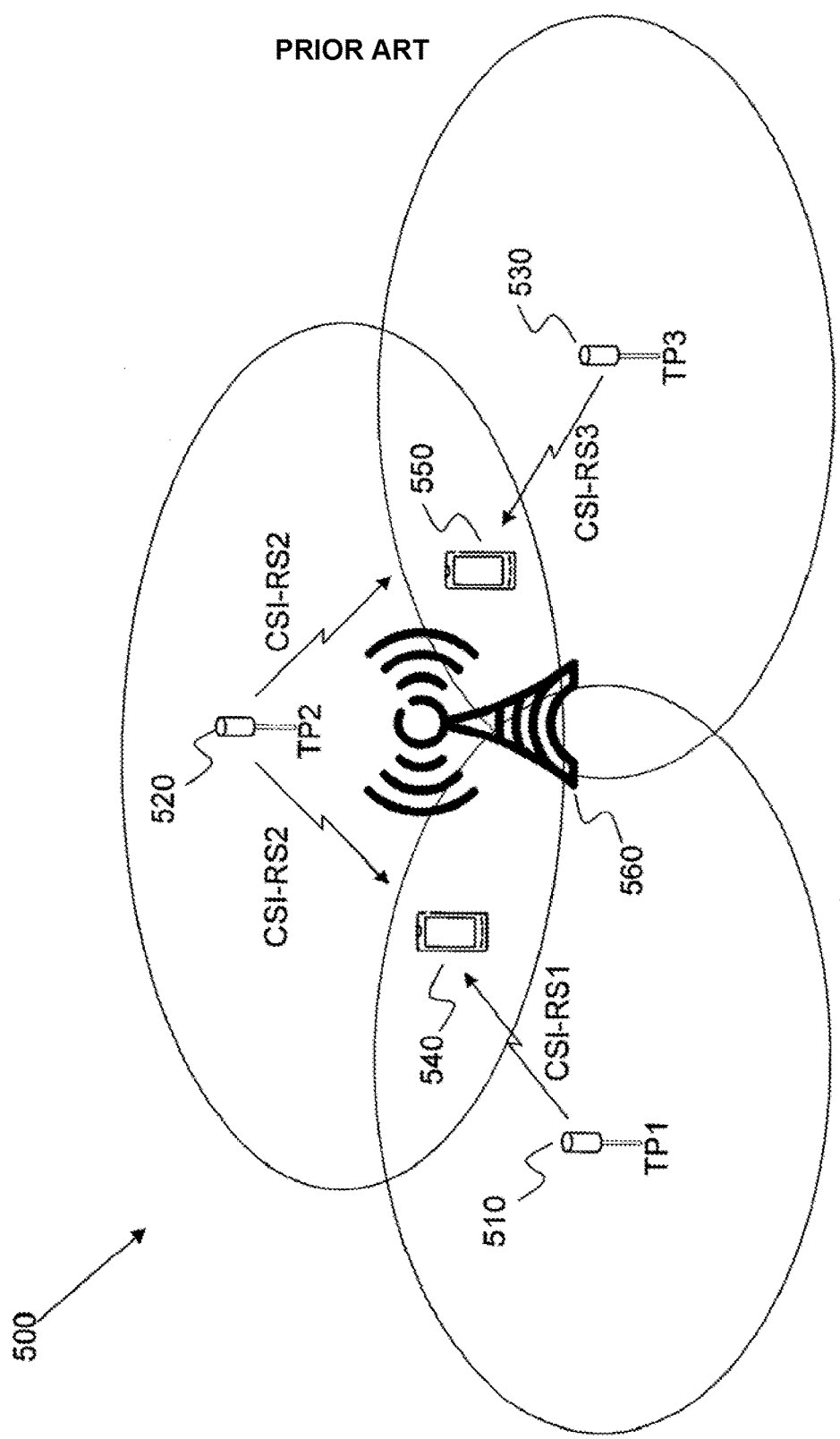
FIG. 5 is a schematic diagram illustrating a CoMP coordination cluster in a wireless network.

FIG. 5 illustrates an example wireless communications system 500 in which various embodiments of the invention may be implemented. The three transmission points 510, 520 and 530 form a CoMP coordination cluster. In the following, for purposes of illustration and not limitation, it will be assumed that the communications system 500 is an LTE system. Transmission points 510, 520 and 530 are remote radio units (RRU:s), controlled by eNodeB 560. In an alternative scenario (not shown), the transmission points could be controlled by separate eNodeBs. It should be appreciated that, generally speaking, each network node, e.g. eNodeB, may control one or more transmission points, which may either be physically co-located with the network node, or geographically distributed. In the scenario shown in FIG. 5, it is assumed that the transmission points 510, 520 and 530 are connected to eNodeB 560, e.g. by optical cable or a point-to-point microwave connection. In the case where some or all of the transmission point forming the cluster are controlled by different eNodeBs, those eNodeBs would be assumed to be connected with each other e.g. by means of a transport network, to be able to exchange information for possible coordination of transmission and reception.

It should be appreciated that although examples herein refer to an eNodeB for purposes of illustration, the invention applies to any network node. The expression "network node" as used in this disclosure is intended to encompass any radio base station, e.g. an eNodeB, NodeB, Home eNodeB or Home NodeB, or any other type of network node that controls all or part of a CoMP cluster.

The communications system 500 further comprises two wireless devices 540 and 550. Within the context of this disclosure, the term "wireless device" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle etc. The wireless device may also be a network node, e.g. a base station. Throughout this disclosure, whenever the term "user equipment" is used this should not be construed as limiting, but should be understood as encompassing any wireless device as defined above.

As mentioned previously, a model of the received data vector on TFREs carrying data symbols can be written as $$y = H W_{N_{Tx}} s + e \quad (1)$$

where we now for notational simplicity have omitted the subscript n. For feedback computations, the UE needs to assume a similar model for the reception of a hypothetical transmission.

In one embodiment, the UE estimates the channel matrix based on reference signals, e.g., Rel-8 cell specific RS or Rel-10 CSI RS, producing a measurement channel matrix $H_m$. This channel is scaled by a CSI process-specific PMO factor $\alpha_{CQI}$ to produce a model for the data channel matrix H, which in turn is used to form a measurement model for feedback determination as $$y = \sqrt{\alpha_{CQI}} H_m W_{N_{Tx}} s + e \quad (2)$$

Note that $\alpha_{CQI}$ is not necessarily independently configurable for each CQI process, for example, some CQI processes may be grouped to use the same PMO configuration, moreover the CSI process specific PMO may be configured by means of radio resource control or be part of the CSI reporting assignment in an aperiodic CSI report. Alternatively the PMOs are specified to a predetermined value in the standard.

A PMO factor can take on many equivalent forms, including be specified in dB or linear scale, re-parameterized as a power offset instead of a scaling factor, etc.

The measurement model with the CQI process specific scaling/PMO of the channel matrix part is used by the UE for determining the CSI to report; for example for selecting which rank, PMI and CQI to report.

More generally, some embodiments provide a method in a wireless device for reporting CSI for a CSI process, as will now be described with reference to FIG. 5 and the flowchart of FIG. 8. As mentioned above, the CSI process corresponds to a reference signal resource and an interference measurement resource. The reference signal resource comprises a set of resource elements in which one or more reference signals corresponding to a desired signal are received. "Desired signal" in this context means a signal intended for reception by the wireless device. The interference measurement resource comprises a set of resource elements in which one or more signals assumed to be interfering with the desired signal are received.

In particular embodiments the reference signal resource is a CSI-RS resource. However, the reference signal resource may be any other type of RS resource which may be used to estimate a desired signal, e.g. a CRS resource.

The wireless device obtains 810 an adjustment value associated with the CSI process. The adjustment value may be obtained from a network node, e.g. a serving eNodeB. Alternatively, an indication of the adjustment value is obtained from the network node, e.g. in the form of an index into a lookup table, and the corresponding adjustment value is retrieved from a storage device, such as from the memory of the wireless device.

In step 820, the wireless device estimates an effective channel based on one or more reference signals received in the reference signal resource, e.g. based on one or more CSI-RS. The wireless device then applies 830 the adjustment value to the estimated effective channel. Thus, the wireless device obtains an adjusted effective channel.

Applying the adjustment value may be done in various different ways depending on the form of the adjustment value. In some variants, the adjustment value is an additive power measurement offset, and the wireless device applies the adjustment value by adding it to the channel estimate. In other variants, the adjustment value is a scaling factor, and the wireless device multiplies the channel estimate by the adjustment value. Furthermore, the adjustment value may be specified in dB or in linear scale.

The wireless device then determines 840 channel state information based on the adjusted effective channel, and on interference estimated based on the interference measurement resource. In some variants, the IMR may be a resource which is specifically configured to measure interference. For example, an IMR may consist of resource elements where all transmission points within the CoMP cluster are silent, enabling the wireless device to measure inter-cluster interference and noise. In other variants, the IMR may be a reference signal resource, e.g. a CRS resource. The wireless device may estimate interference in the CRS resource by analyzing the residual signal after subtracting the decoded CRS signal. Methods for determining CSI based on a channel estimate and measured interference are known in the art and will not be described in detail here.

Finally, the wireless device transmits 850 the channel state information to a network node.

The effect of applying the adjustment value is to compensate for an error or mismatch in the measured interference. As has been described above, such errors may result e.g. from measuring on an IMR which does not match the interference hypothesis that the network intended to apply for this CSI process. By associating an adjustment value with the CSI process, it is made possible to apply different adjustment values for each CSI process, even for CSI processes correspond to the same reference signal resource.

In another embodiment there is one component of the power measurement offset that is specific to a CQI process. For example, there may be a power measurement offset $P_{CQI}$ (typically defined in dB scale) that is associated with a particular CQI process. This offset may then be applied in addition to other power measurement offset that are associated with e.g., Specific reference signals (such as $P_c$ for CSI-RS)

Specific recommended transmission ranks

Such that the combined power measurement offset is obtained as $$\alpha_{CQI} = P_{CQI} + P_{CQI\_agnostic} \, [dB]$$

where $P_{CQI\_agnostic}$ is the combined power measurement offset that is agnostic to the particular CQI process.

One such example corresponds to when the desired signal effective channel is measured on a particular CSI-RS which has an associated power measurement offset $P_c$, which is agnostic to the particular CQI process. Two different CQI Processes sharing the same desired effective channel would then result in the two different power measurement offsets $$\alpha^1{}_{CQI}=P^1{}_{CQI}+P_c \text{ [dB]}$$

$$\alpha^2{}_{CQI}=P^2{}_{CQI}+P_c \text{ [dB]}$$

Figures 8, 9:
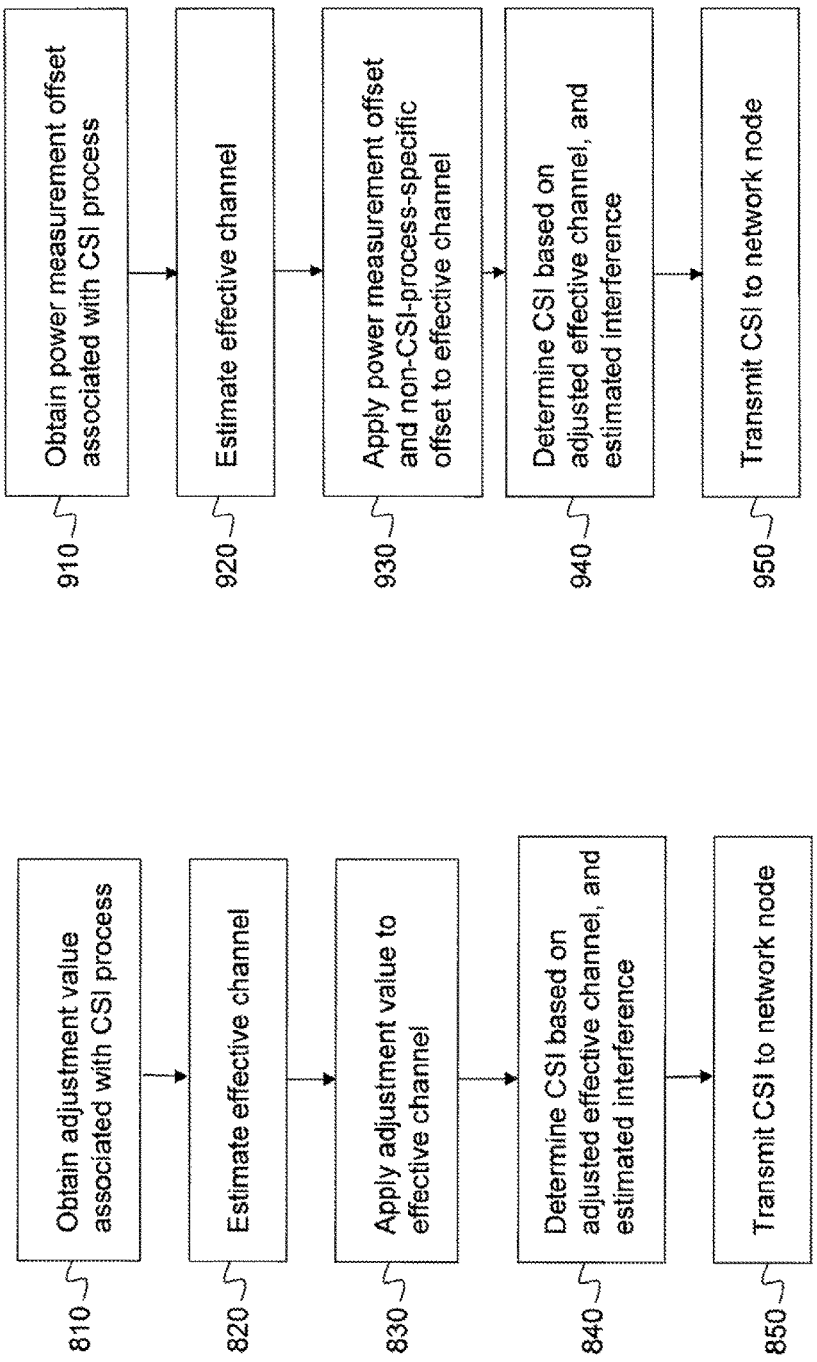
FIGS. 8-11 are flow charts illustrating methods according to some embodiments.

The flowchart in FIG. 9 illustrates a method in a wireless device for reporting CSI for a CSI process according to some embodiments. In these embodiments, a combination of a CSI-process-specific and a CQI-agnostic power offset are applied, similar to what was described above. Note that "CSI process" is defined in the same way as described in connection with FIG. 8 above.

In particular variants the reference signal resource is a CSI-RS resource. However, as mentioned above the reference signal resource may be any other type of RS resource which may be used to estimate a desired signal, e.g. a CRS resource.

The wireless device obtains 910 a power measurement offset associated with the CSI process. The power measurement offset may be obtained from a network node, e.g. a serving eNodeB. Alternatively, an indication of the power measurement offset is obtained from the network node, e.g. in the form of an index into a lookup table, and the corresponding power measurement offset is retrieved from a storage device, such as from the memory of the wireless device.

In step 920, the wireless device estimates an effective channel based on one or more reference signals received in the reference signal resource, e.g. based on one or more CSI-RS. The wireless device then applies 930 the adjustment value to the estimated effective channel. Thus, the wireless device obtains an adjusted effective channel.

In this embodiment, the wireless device also applies an additional non-CSI-process specific power offset to the estimated effective channel. This offset may also be referred to as a "CSI agnostic offset". As a particular example, the reference signal resource is a CSI-RS, and the additional power offset is the offset $P_c$ associated with the CSI-RS. As explained above, the offset $P_c$ may have been signalled previously, e.g. in downlink control information (DCI).

A further possibility is to apply several non-CSI process-specific offsets in addition to the CSI process-specific offset, e.g. the $P_c$ for CSI RS, and one or more offsets associated with specific recommended transmission ranks.

The CSI-process specific offset and the additional offset (or offsets) may be added together to form a combined offset, before applying the combined offset to the estimated effective channel.

Applying the adjustment value may be done in various different ways depending on the form of the adjustment value. In some variants, the adjustment value is an additive power measurement offset, and the wireless device applies the adjustment value by adding it to the channel estimate. In other variants, the adjustment value is a scaling factor, and the wireless device multiplies the channel estimate by the adjustment value. Furthermore, the adjustment value may be specified in dB or in linear scale.

The wireless device then determines 940 channel state information based on the adjusted effective channel, in the same way as for step 840 above.

Finally, the wireless device transmits 950 the channel state information to a network node.

Figure 6:
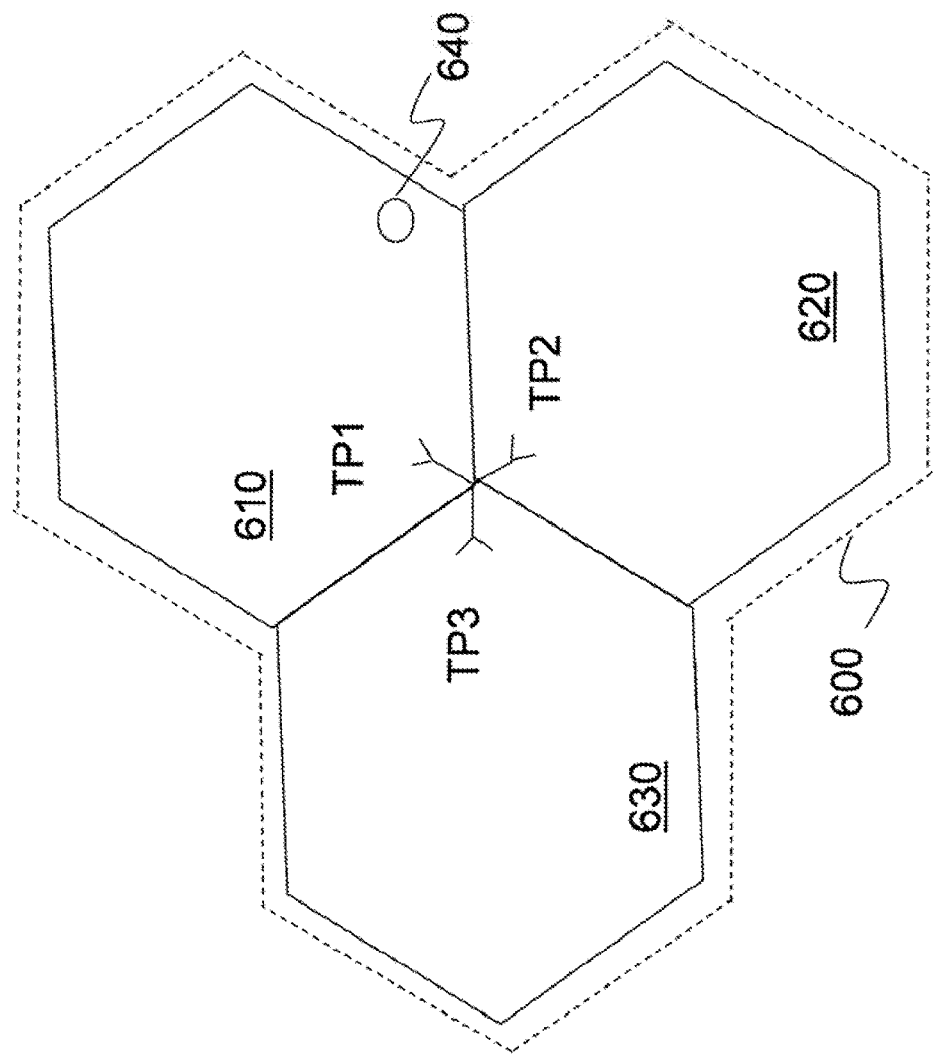
FIG. 6 is a schematic diagram illustrating a CoMP coordination cluster in a wireless network.

Another approach for estimating interference, which may be used in conjunction with measurements based on an interference measurement resource, is to have the terminal emulate interference from within the coordinated points according to an interference hypothesis, by for example assuming an isotropic transmission from each of the transmission points that are assumed interfering for the interference hypothesis. This has the advantage that it may be sufficient that the terminal performs interference measurements on a single IMR, where there is no interference from the coordinated transmission points, from which each of the interference hypothesis are derived. For example, if this residual interference and noise is measured and characterized, by the terminal, as a complex valued Gaussian random process $$e_n \in CN(0,Q_e),$$

where $Q_e$ is the correlation matrix and the elements of $e_n$ corresponds to an interference realization on each of the receive antennas. Then the terminal can amend the residual interference to correspond to a particular CoMP interference hypothesis by emulating intra CoMP cluster interference from a transmission point, for which it has measured an effective channel, $H_{eff}$, as $$\tilde{e}_n = e_n + H_{eff} q_n$$

where $q_n$ is an isotropic random signal of a specific nominal power. Note, however, that for a terminal to be able to emulate intra CoMP cluster interference the terminal needs to acquire a reliable channel estimate for each point it should add interference for. In practice this means that, The terminal needs to know the presence of the node, or more specifically, the presence of the associated reference signals on which it would measure the channel The SINR of the reference signals needs to be sufficiently high to perform sufficiently accurate estimates of the effective channel The processing of the UE must be dimensioned to be capable of tracking each of these effective channel estimates In practice this means that the UE is likely only be able to emulate interference from within a configured CoMP Measurement Set, which is limited in size. Typically, the size of the measurement set is up to two, or possibly three TPs (i.e., CSI-RS resources). Hence, for CoMP cooperation clusters of more than two nodes, which is a typical scenario (e.g. three sector intra site macro coordination, as illustrated in FIG. 6) the CoMP Measurement Set is likely not able to represent all nodes, and hence the interference from outside the CoMP Measurement Set, but within the CoMP coordination cluster, must be captured by other means than UE emulating the interference.

In another embodiment a CQI process involves recommending CSI for a hypothetical channel wherein the UE emulates interference from an interferer, as outlined above, as $$y = \sqrt{\alpha_{CQI}} H_m W_{N_{Tx}} s + \sqrt{\beta_{CQI}} H_{eff} q_n + e \quad (3)$$

where $\beta_{CQI}$ is a power measurement offset for the effective channel of the emulated interferer.

This embodiment has the advantage that the impact of the emulated interference on a particular CSI process can be separately configurable.

In one embodiment, the power measurement offset of an interfering effective channel is not specific (shared) for each CSI process; that is, $$\beta_{CQI} = \beta$$

where β is agnostic to the CSI process.

In another embodiment $\beta_{CQI}$ is, at least partially, determined by a CSI process specific power measurement offset configuration. One example corresponding to $$\beta_{CQI} = P_{\beta,CQI} + P_{\beta,CQI\_agnostic} \text{ [dB]}$$

where $P_{\beta,CQI}$ is a power measurement offset, specific to a particular CSI process, and $P_{\beta,CQI\_agnostic}$ are other related power measurement offsets that are agnostic to the CSI process (e.g., $P_c$ of a CSI-RS associated with the interferer).

In a further embodiment $P_{\beta,CQI} = P_{CQI}$. This embodiment has the advantage that it reduces complexity and configuration overhead, but yet allows configuration of the impact of the residual interference e on the particular CSI process. Note that the effective SINR of (3) can be expressed as $$SINR = \frac{\alpha_{CQI} S}{\beta_{CQI} I_{emulated} + I_e} = \frac{P_{CQI\_agnostic} S}{P_{\beta,CQI\_agnostic} \cdot I_{emulated} + \frac{I_e}{P_{CQI}}}$$

where S and $I_{emulated}$ are the desired signal power and the emulated interference power, respectively, not including associated power offset, and $I_e$ is the measured interference and noise power (corresponding to e). Note that the power offsets are expressed in linear scale in the equation (not in dB as above). As can be seen, the CSI process specific configuration, $P_{CQI}$, translates to a configuration of how much the measured residual interference should affect the CSI reports for the CSI process.

Figure 10:
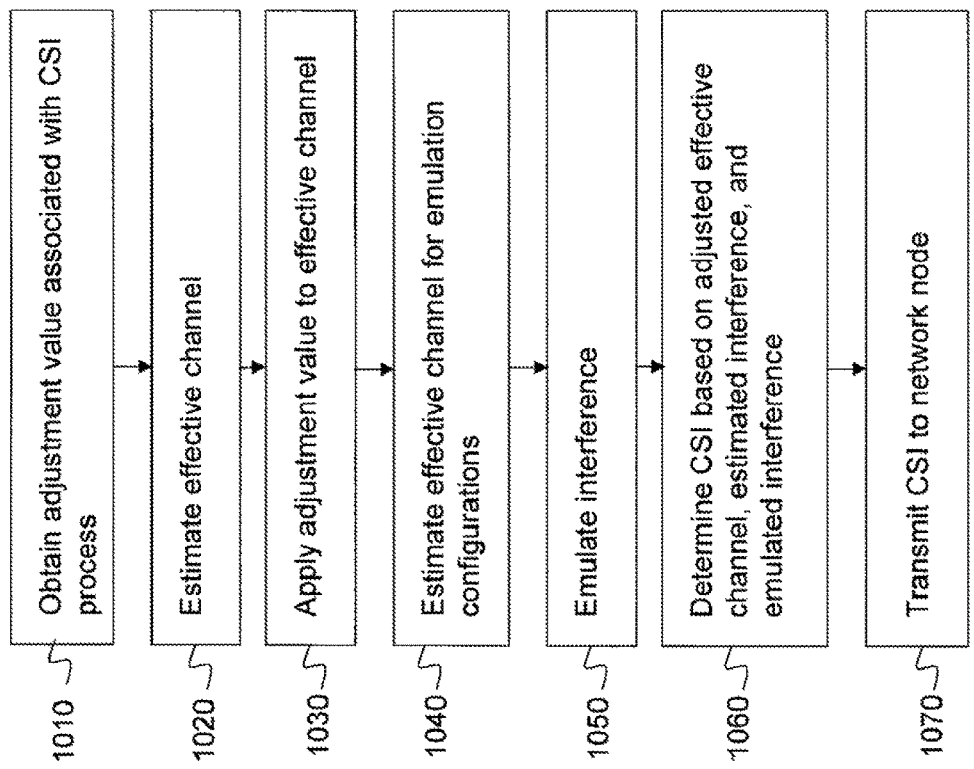

FIG. 10 illustrates a method in a wireless device for reporting CSI for a CSI process according to some embodiments, in a scenario where the wireless device emulates interference. The CSI process corresponds to a reference signal resource and an interference measurement resource, where the reference signal resource and IMR are defined as described in connection with FIG. 8 above. The CSI process further corresponds to one or more interference emulation configurations. Each interference emulation configuration is associated with a reference signal received from an assumed interferer.

In particular variants, the reference signal resource is a CSI-RS resource. However, as mentioned above, the reference signal resource may be any other type of RS resource which may be used to estimate a desired signal, e.g. a CRS resource.

The wireless device obtains 1010 an adjustment value associated with the CSI process. The adjustment value may be obtained in any of the ways described in connection with FIG. 8 above.

In step 1020, the wireless device estimates an effective channel, and applies 1030 the adjustment value to the estimated effective channel. These steps correspond to steps 820 and 830 above. Applying the adjustment value may be done in various different ways, as described in connection with FIG. 8 above.

The wireless device then emulates interference according to the emulation configuration or configurations in steps 1040-1050. In step 1040, the wireless device estimates, for each interference emulation configuration, an effective channel based on the associated reference signal. The wireless device then emulates 1050 interference for each interference emulation configuration based on the estimated effective channel for that configuration. As explained above, one way of emulating interference is to multiply the channel estimate by an isotropic random signal.

In a variant of this embodiment, the wireless device applies an adjustment value to the emulated interference, e.g. by multiplying the emulated interference for each emulation configuration with a scaling factor. The adjustment value may be the same value that was applied to the channel estimate, i.e. the CSI-process-specific adjustment value that was obtained in step 1010, or it may be a second adjustment value. The second adjustment value may be obtained e.g. via signalling from a network node, e.g. RRC signalling, or it may be retrieved from the memory of the wireless device e.g. based on an index received from a network node.

The second adjustment value may be common to all CSI processes, i.e. non-CSI-process specific or CSI agnostic. Alternatively, the second adjustment value may be common to a group of CSI processes, or it may be specific to this particular CSI process. In the latter case, two CSI-process-specific adjustment values are thus obtained in step 1010, one which is applied to the channel estimate corresponding to the desired signal, and one which is applied to the emulated interfering signal or signals.

In other variants, the second adjustment value comprises a CSI-process-specific and a non-CSI-process specific component. For example, the second adjustment value may be a combination of a CSI-RS-specific offset $P_c$, and a CSI-process-specific value.

The wireless device then determines 1060 channel state information based on the adjusted effective channel, on interference estimated based on the interference measurement resource, and on the emulated interference. In a particular variant the wireless device adds the interference measured based on the IMR and the emulated interference for each configuration, to form a combined interference estimate.

Finally, the wireless device transmits 1070 the channel state information to a network node In another embodiment a CQI process involves recommending aggregated CSI for joint transmission over multiple hypothetical channels corresponding to different CSI-RS resources as $$y = \left( \sum_i \sqrt{\alpha_{CQI,i}} H_{m,i} W_{N_{T,i} \times r} \right) s + e$$

where the indices i corresponds to the different CSI-RS resources that are associated with the joint transmission, and where $\alpha_{CQI,i}$, is a CQI process specific set of power measurement offsets for the channels, $H_{m,i}$, of the said resources.

An advantage of this embodiment is that it allows the eNodeB to configure the UE to compensate for the potential loss of signal strength due to rapidly varying phase variations between transmission points when performing joint transmission, resulting in non-coherent combining at the time of transmission.

In a further embodiment the said power measurement offsets for the different channels are all equal within the CQI process $\alpha_{CQI,i} = \alpha_{CQI}$, or share a common component, $P_{CQI}$, (that is separately configurable) as $$\alpha_{CQI,i} = P_{CQI} + P_{c,i} \text{ [dB]},$$

where $P_{c,i}$ is an effective channel specific offset (e.g., tied to particular reference signal).

A method in a wireless device for reporting CSI for a CSI process, according to some embodiments in a joint transmission scenario, will now be described, once again with reference to FIG. 8. The CSI process corresponds to at least two reference signal resources and an interference measurement resource. The CSI process optionally also corresponds to one or more interference emulation configurations, as described above. In particular variants, the reference signal resource is a CSI-RS resource. However, as mentioned above, the reference signal resource may be any other type of RS resource which may be used to estimate a desired signal, e.g. a CRS resource.

The wireless device obtains 810 an adjustment value associated with each one of the reference signal resources for the CSI process. The adjustment values may be obtained in any of the ways described in connection with FIG. 8 above.

In step 820, the wireless device estimates an effective channel for each reference signal resource of the CSI process, and applies the adjustment value associated with the reference signal resource to the estimated effective channel, obtaining an adjusted effective channel. Applying the adjustment value may be done in various different ways, as described above.

The wireless device then determines 840 channel state information based on the adjusted effective channels, and on interference estimated based on the interference measurement resource. Optionally, the wireless device may also base the CSI on emulated interference, as described above.

Finally, the wireless device transmits 850 the channel state information to a network node.

Figure 7:
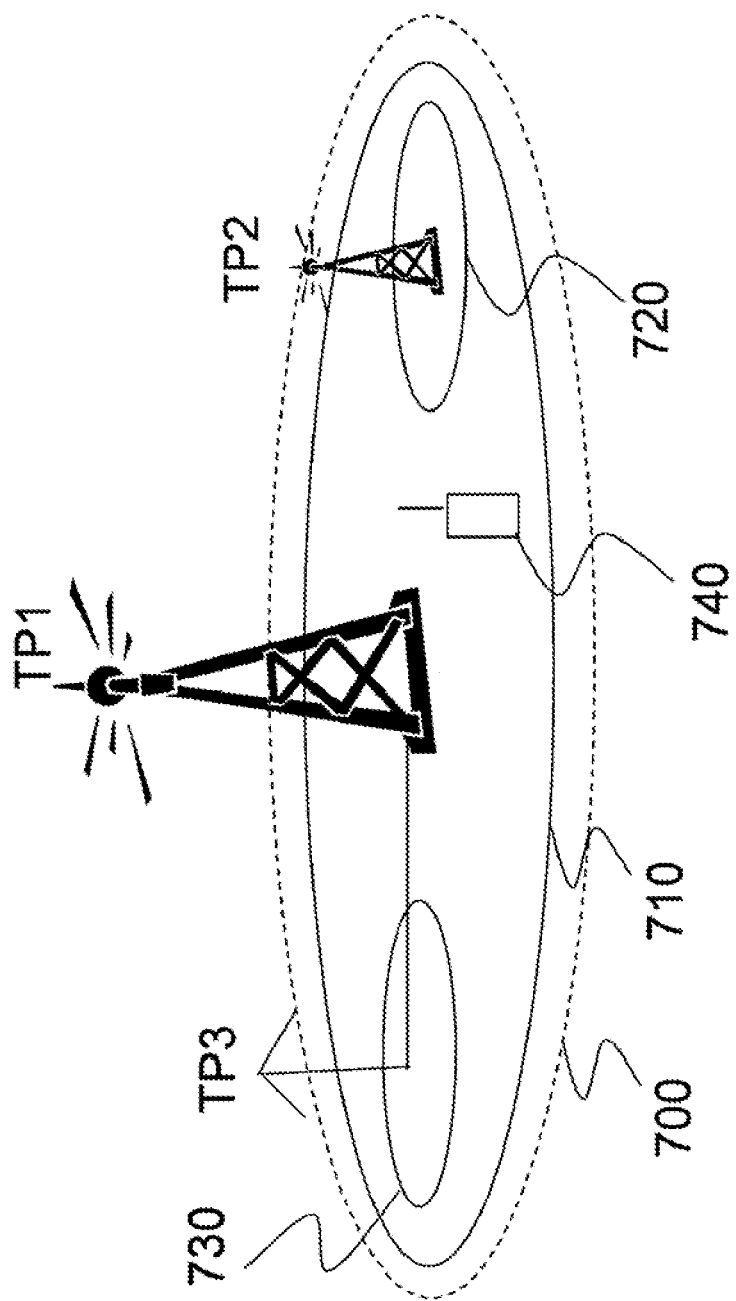
FIG. 7 is a schematic diagram illustrating a CoMP coordination cluster in a wireless network.
Figure 11:
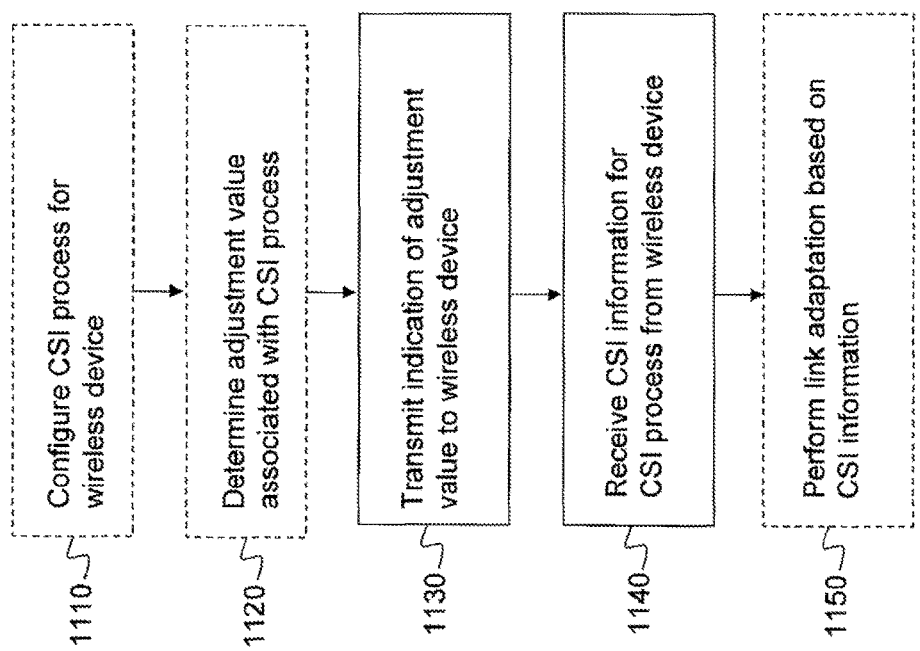

FIG. 11 illustrates a method in a network node for receiving CSI information for a CSI process from a wireless device according to some embodiments. This method corresponds to the wireless device methods shown in FIGS. 8-10. The network node is comprised in or controls a cluster for coordinated multipoint transmission, e.g. the cluster TP1-TP3 shown in FIG. 5. More generally, the network node is associated with the cluster. As a particular example, the network node may be the eNodeB 560 controlling TP1-TP3, which are remote radio heads. In an alternative scenario, such as that shown in FIG. 6, the network node is an eNodeB with three sector antennas which correspond to transmission points TP1-TP3. In yet another scenario, as shown in FIG. 7, TP1-TP3 may form a CoMP cluster and the network node may either be the eNodeB controlling TP1 and TP3, or the eNodeB controlling TP2, and serving pico cell 720.

As mentioned above, the CSI process corresponds to a reference signal resource and an interference measurement resource, and optionally also one or more interference emulation configurations.

According to the method, the network node determines 1120 an adjustment value associated with the CSI process, based on an interference hypothesis associated with the CSI process. The interference hypothesis corresponds to a set of transmission points assumed to be interfering with a signal intended for reception by the wireless device.

In some variants, the adjustment value is determined such that it compensates for interference that will be transmitted from an assumed interfering transmission point according to the interference hypothesis, but which will not be estimated by the wireless device. For example, the adjustment value may be determined to compensate for interference from one or more transmission points that are assumed to be interfering according to the interference hypothesis, but are not comprised in the measurement set for the wireless device.

Some particular methods for determining the adjustment value will now be described. The CSI process specific adjustment parameter may, for example, be determined by the eNodeB by monitoring the hybrid-ARQ feedback from the UE: If the fraction of the received hybrid-ARQ messages that are associated with transport blocks transmitted according to a recommendation of a particular CSI process corresponds to a NACK (e.g., not successfully decoded by the UE) exceeds (or is below) a target threshold, the adjustment value of that CSI Process can be configured more conservatively (or aggressively) as to better meet the target threshold. Such procedures are often collectively referred to as outer loop link adaptation (OLLA), where the above procedure corresponds to a CSI Process specific OLLA, and where the network configures the OLLA adjustment to be performed by the UE by means of the CSI Process specific adjustment parameter (as opposed to having eNodeB side compensation, where the reported CQIs are adjusted by the eNodeB when selecting a transport format for a downlink transmission).

In an alternative/complementary implementation, the eNodeB also utilize hybrid-ARQ messages transmitted by other UEs that are configured with a similar CSI Process, which could speed up the convergence of the CSI Process specific OLLA.

In yet another such implementation, the eNodeB utilizes information specific to the deployment that results in predictable biases in the CSI reporting, such as predictable underestimation of the interference levels for specific CSI processes caused by, for example, interfering transmission points that are muted on an associated interference measurement resource.

The network node further transmits, 1110, configuration information for the CSI process to the wireless device.

In step 1130 the network node transmits 1130 an indication of the adjustment value to the wireless device. In a variant, the indication is transmitted as part of the CSI process configuration information. By indicating the adjustment value, the network node enables the wireless device to compensate for an incorrect or incomplete interference measurement, as described above with reference to FIGS. 8-10.

The network node then receives 1140 channel state information related to the CSI process from the wireless device.

Optionally, the network node performs 1150 link adaptation, based on the received channel state information.

FIGS. 12-13 illustrate devices configured to execute the methods described in FIGS. 8-11.

FIG. 12*a* illustrates a network node 1200 for receiving, from a wireless device 1300, channel state information, CSI, for a CSI process. The network node 1200 comprises processing circuitry 1220, and is connectable to radio circuitry 1210. In some variants, the radio circuitry 1210 is comprised in the network node 1200, whereas in other variants, the radio circuitry 1210 is external. For example, in the example scenario in FIG. 5, the network node 560 corresponds to network node 1200. The radio circuitry in this example resides in the distributed transmission points TP1-TP3, which are not physically co-located with network node 560. However, in the example shown in FIG. 6, the transmission points correspond to sector antennas at the network node, e.g. the eNodeB, and in this case the radio circuitry may be comprised in the network node.

The processing circuitry 1220 is configured to transmit, via the radio circuitry 1210, an indication of an adjustment value associated with the CSI process to the wireless device 1300, and to receive, via the radio circuitry 1210, channel state information related to the CSI process from the wireless device 1300.

Figure 12B:
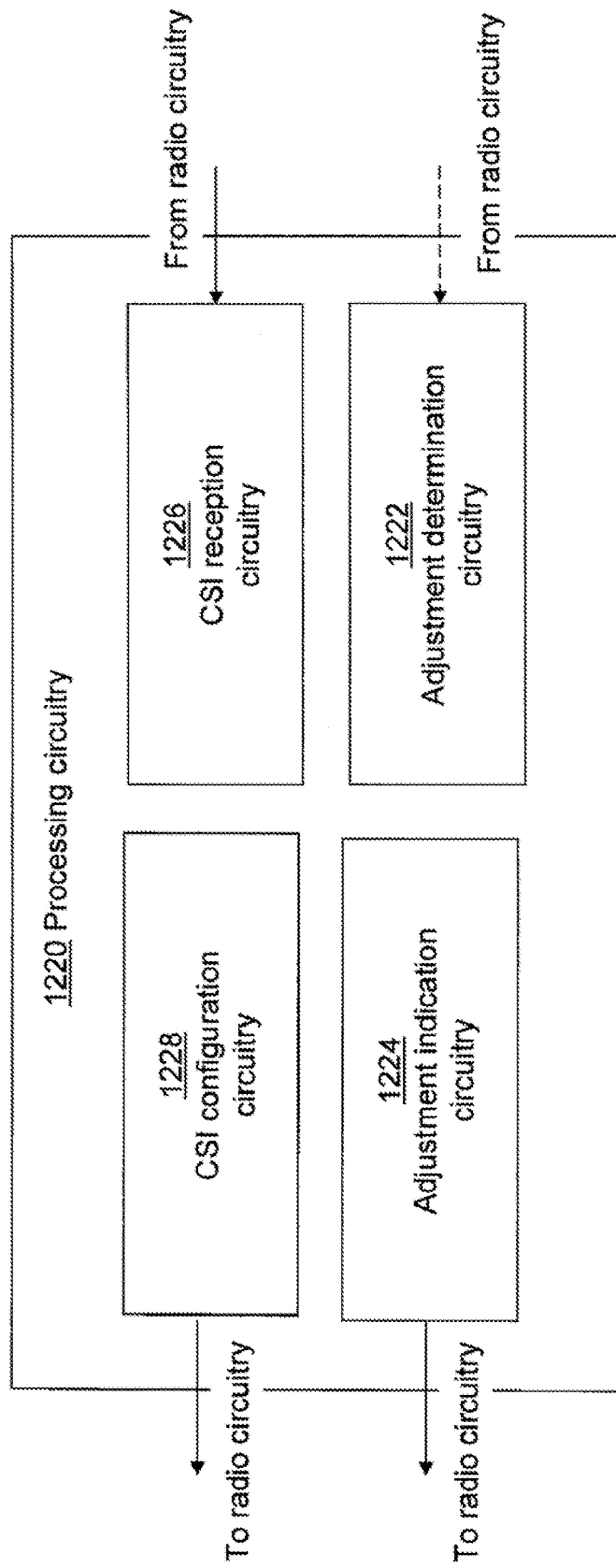
FIG. 12b is a block diagram illustrating details of a network node according to some embodiments.

FIG. 12*b* illustrates details of a possible implementation of processing circuitry 1220.

Figure 13A:
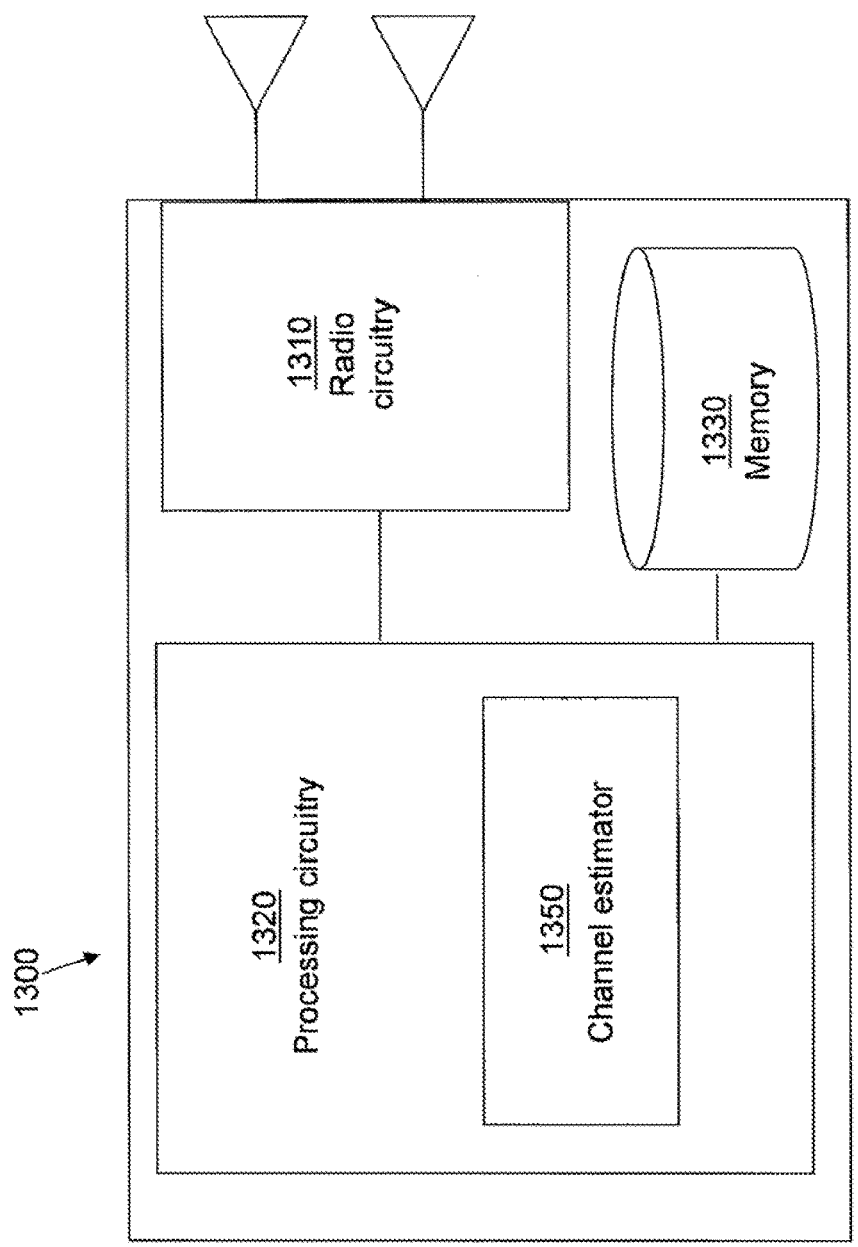
FIG. 13a is a block diagram illustrating a wireless device according to some embodiments.

FIG. 13a shows a wireless device 1300 for reporting channel state information, CSI, for a CSI process. The wireless device comprises radio circuitry 1310 and processing circuitry 1320. The processing circuitry 1320 is configured to obtain an adjustment value associated with the CSI process, and to estimate an effective channel based on one or more reference signals received, via the radio circuitry 1310, in the reference signal resource. The processing circuitry 1320 is further configured to apply the adjustment value to the estimated effective channel, obtaining an adjusted effective channel, to determine channel state information based on the adjusted effective channel, and on interference estimated based on the interference hypothesis, and to transmit, via the radio circuitry 1310, the channel state information to a network node 1200.

Figure 13B:
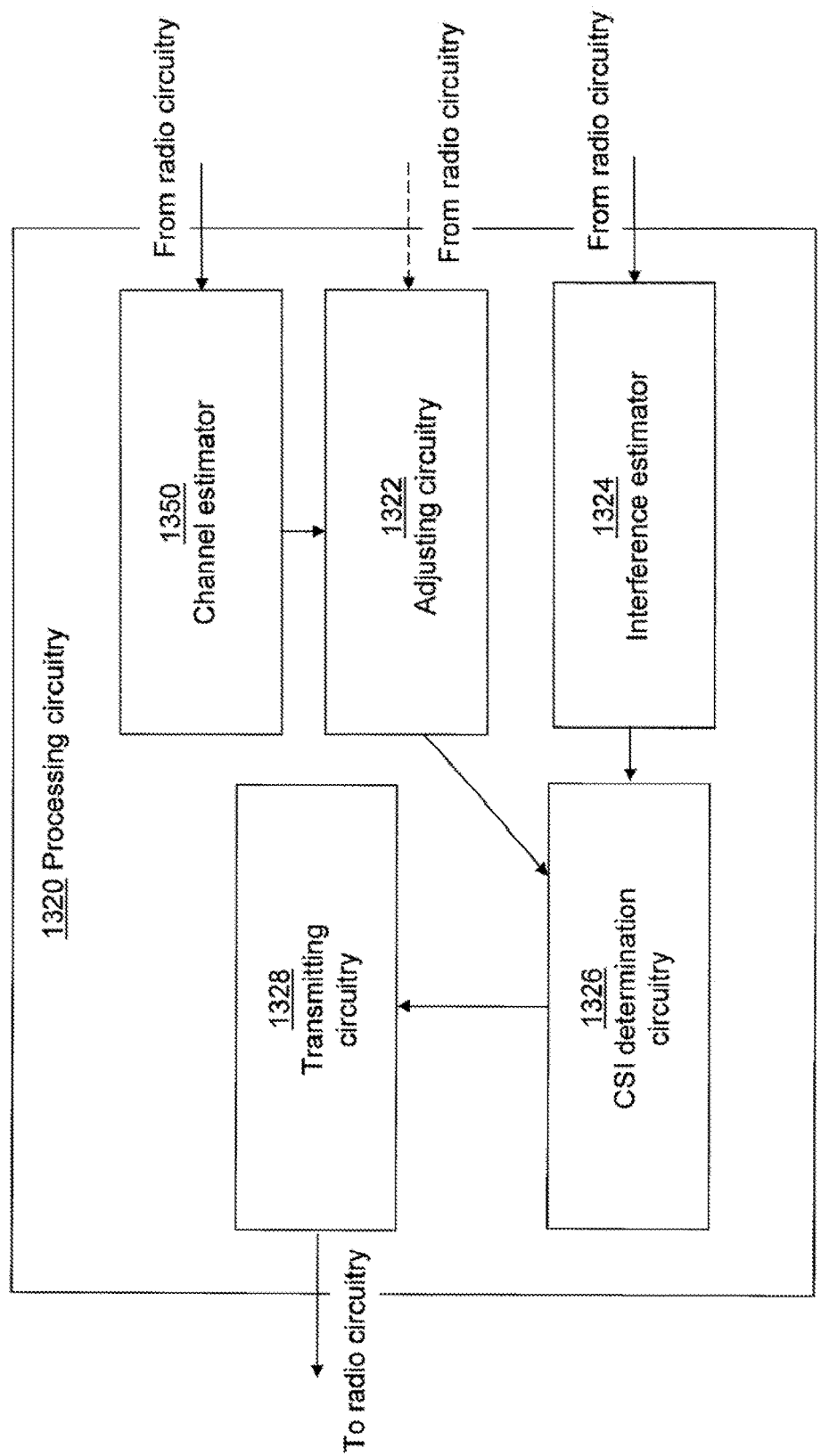
FIG. 13b is a block diagram illustrating details of a wireless device according to some embodiments.

FIG. 13b illustrates details of a possible implementation of processing circuitry 1320.

The processing circuitry 1220, 1320 may comprise one or several microprocessors 1630, digital signal processors, and the like, as well as other digital hardware and a memory. The memory, which may comprise one or several types of memory such as read-only memory (ROM), random-access memory, cache memory, flash memory devices, optical storage devices, etc., stores program code for executing one or more telecommunications and/or data communications protocols and for carrying out one or more of the techniques described herein. The memory further stores program data and user data received from the wireless device.

Not all of the steps of the techniques described herein are necessarily performed in a single microprocessor or even in a single module.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

When using the word "comprise" or "comprising" it shall be interpreted as non-limiting, i.e. meaning "consist at least of".

The present invention is not limited to the above-describe preferred embodiments. Various alternatives, modifications and equivalents may be used. Therefore, the above embodiments should not be taken as limiting the scope of the invention, which is defined by the appended claims.

The invention claimed is:

1. A method in a wireless node which communicates with a network node, for reporting channel state information, CSI, for a CSI process, the CSI process corresponding to a reference signal resource and an interference measurement resource, the method comprising:
obtaining an adjustment value associated with the CSI process;
determining an adjusted effective channel based on the adjustment value and one or more reference signals received in the reference signal resource;
determining channel state information based on the adjusted effective channel, and on interference estimated based on the interference measurement resource; and
transmitting the channel state information to the network node.

2. The method of claim 1, wherein the CSI process further corresponds to one or more interference emulation configurations, wherein each interference emulation configuration is associated with a reference signal received from an assumed interferer, the method further comprising:
estimating, for each interference emulation configuration, an effective channel based on the associated reference signal;
emulating interference for each interference emulation configuration based on the estimated effective channel for that configuration; and
determining channel state information based also on the emulated interference.

3. The method of claim 2, further comprising applying the adjustment value to the emulated interference for each interference emulation configuration.

4. The method of claim 2, further comprising obtaining a second adjustment value for the interference emulation configurations, and applying the second adjustment value to the emulated interference for each configuration.

5. The method of claim 1, wherein the CSI process corresponds to at least two reference signal resources, and wherein an adjustment value is associated with each one of the reference signal resources.

6. The method of claim 5, further comprising:
for each reference signal resource of the CSI process, determining an adjusted effective channel based on the adjustment value and the one or more reference signals received in the reference signal resource; and determining channel state information based on the adjusted effective channels, and on estimated interference.

7. The method of claim 1, wherein the adjustment value is a power measurement offset.

8. The method of claim 7, wherein the method further comprises applying an additional power offset in determining the adjusted effective channel.

9. The method of claim 8, wherein the reference signal is a channel state information reference signal, CSI-RS, and wherein the additional power offset is associated with the CSI-RS.

10. The method of claim 1, wherein the adjustment value is a CSI process-specific power measurement offset (PMO) scaling factor.

11. The method of claim 1, further comprising determining channel state information for at least one other CSI process based on the adjustment value.

12. The method of claim 1, wherein the adjustment value is obtained from a network node.

13. The method of claim 1, further comprising receiving a CSI process adjustment value index from a network node, the CSI process adjustment value index being an index to a predefined lookup table, and obtaining the adjustment value by retrieving the adjustment value from a storage device in accordance with the received predefined lookup table.

14. The method of claim 1, wherein the channel state information comprises one or more of: a channel quality indicator, a precoding matrix indicator, a rank indication, and a precoding matrix type.

15. The method of claim 1 wherein the wireless node is configured with two CSI processes corresponding to the same reference signal resource, and associated with different adjustment values.

16. The method of claim 1, wherein the reference signal resource comprises a set of resource elements in which one or more reference signals corresponding to a desired signal are received, and wherein the interference measurement resource comprises a set of resource elements in which one or more signals assumed to be interfering with the desired signal are received.

17. The method of claim 1, wherein the reference signal resource is a CSI-RS resource.

18. The method of claim 1, wherein the interference measurement resource is a cell-specific reference signal resource, and wherein interference is estimated by subtracting a decoded cell-specific reference signal from the signal received in the cell-specific reference signal resource.

19. A method in a network node for receiving, from a wireless node which communicates with the network node, channel state information, CSI, for a CSI process, the CSI process corresponding to a reference signal resource and an interference measurement resource, the network node being comprised in a cluster for coordinated multipoint transmission, the method comprising:
transmitting, to the wireless node, an indication of an adjustment value associated with the CSI process; and
receiving channel state information related to the CSI process from the wireless node.

20. The method of claim 19, wherein the reference signal resource comprises a set of resource elements in which one or more reference signals corresponding to a signal intended for reception by the wireless node are transmitted, and wherein the interference measurement resource comprises a set of resource elements in which one or more signals assumed to be interfering with a desired signal are received.

21. A wireless node which communicates with a network node, for reporting channel state information, CSI, for a CSI process, the CSI process corresponding to a reference signal resource and an interference measurement resource, the wireless node comprising memory and processing circuitry in communication with radio circuitry, the processing circuitry configured to:
obtain an adjustment value associated with the CSI process;
determine an adjusted effective channel based on the adjustment value and one or more reference signals received in the reference signal resource;
determine channel state information based on the adjusted effective channel, and on interference estimated based on the interference measurement resource; and
transmitting the channel state information to the network node.

22. The wireless node of claim 21, wherein the CSI process further corresponds to one or more interference emulation configurations, wherein each interference emulation configuration is associated with a reference signal received from an assumed interferer, wherein the processing circuitry is further configured to:
estimate, for each interference emulation configuration, an effective channel based on the associated reference signal;
emulate interference for each interference emulation configuration based on the estimated effective channel for that configuration; and
determine channel state information based also on the emulated interference.

23. The wireless node of claim 22, wherein the processing circuitry is further configured to apply the adjustment value to the emulated interference for each interference emulation configuration.

24. The wireless node of claim 22, wherein the processing circuitry is further configured to obtain a second adjustment value for the interference emulation configurations, and apply the second adjustment value to the emulated interference for each configuration.

25. The wireless node of claim 21, wherein the CSI process corresponds to at least two reference signal resources, and wherein an adjustment value is associated with each one of the reference signal resources.

26. The wireless node of claim 25, wherein the processing circuitry is further configured to:
for each reference signal resource of the CSI process, determine an adjusted effective channel based on the adjustment value and the one or more reference signals received in the reference signal resource; and determine channel state information based on the adjusted effective channels, and on estimated interference.

27. The wireless node of claim 21, wherein the adjustment value is a power measurement offset.

28. The wireless node of claim 27, wherein the processing circuitry is further configured to apply an additional power offset in determining the adjusted effective channel.

29. The wireless node of claim 28, wherein the reference signal is a channel state information reference signal, CSI-RS, and wherein the additional power offset is associated with the CSI-RS.

30. The wireless node of claim 21, wherein the adjustment value is a CSI process-specific power measurement offset (PMO) scaling factor.

31. The wireless node of claim 21, wherein the processing circuitry is further configured to determine channel state information for at least one other CSI process based on the adjustment value.

32. The wireless node of claim 21, wherein the adjustment value is obtained from a network node.

33. The wireless node of claim 21, wherein the processing circuitry is further configured to receive a CSI process adjustment value index from a network node, the CSI process adjustment value index being an index to a predefined lookup table, and obtain the adjustment value by retrieving the adjustment value from a storage device in accordance with the received predefined lookup table.

34. The wireless node of claim 21, wherein the channel state information comprises one or more of: a channel quality indicator, a precoding matrix indicator, a rank indication, and a precoding matrix type.

35. The wireless node of claim 21, wherein the wireless node is configured with two CSI processes corresponding to the same reference signal resource, and associated with different adjustment values.

36. The wireless node of claim 21, wherein the reference signal resource comprises a set of resource elements in which one or more reference signals corresponding to a desired signal are received, and wherein the interference measurement resource comprises a set of resource elements in which one or more signals assumed to be interfering with the desired signal are received.

37. The wireless node of claim 21, wherein the reference signal resource is a CSI-RS resource.

38. The wireless node of claim 21, wherein the interference measurement resource is a cell-specific reference signal resource, and wherein interference is estimated by subtracting a decoded cell-specific reference signal from the signal received in the cell-specific reference signal resource.

39. A network node for receiving, from a wireless node which communicates with the network node, channel state information, CSI, for a CSI process, the CSI process corresponding to a reference signal resource and an interference measurement resource, the network node being comprised in a cluster for coordinated multipoint transmission, the network node comprising memory and processing circuitry in communication with radio circuitry, the processing circuitry configured to:

transmit, to the wireless node, an indication of an adjustment value associated with the CSI process; and receive channel state information related to the CSI process from the wireless node.

40. The network node of claim 39, wherein the reference signal resource comprises a set of resource elements in which one or more reference signals corresponding to a signal intended for reception by the wireless node are transmitted, and wherein the interference measurement resource comprises a set of resource elements in which one or more signals assumed to be interfering with a desired signal are received.

* * * * *

UNITED STATES PATENT AND TRADEMARK OFFICE
CERTIFICATE OF CORRECTION

PATENT NO. : 10,305,565 B2  
APPLICATION NO. : 15/486716  
DATED : May 28, 2019  
INVENTOR(S) : Hammarwall et al.

Page 1 of 1

It is certified that error appears in the above-identified patent and that said Letters Patent is hereby corrected as shown below:

In the Specification

In Column 1, Line 16, delete "Terrestrial" and insert -- Terrestrial Radio --, therefor.

In Column 2, Line 58, delete "(COI)," and insert -- (QCI), --, therefor.

In Column 5, Line 37, delete "resources" and insert -- resources elements --, therefor.

In Column 10, Line 49, delete "(RRU:s)," and insert -- (RRU's), --, therefor.

In Column 16, Line 61, delete "$\alpha_{CQI,i} = P_{CQI} + P_{c,I}$ [dB]," and insert -- $\alpha_{CQI,i} = P_{CQI} + P_{c,i}$ [dB], --, therefor.

Signed and Sealed this  
First Day of September, 2020

Andrei Iancu  
*Director of the United States Patent and Trademark Office*